(12) United States Patent
Backholm et al.

(10) Patent No.: US 10,244,479 B1
(45) Date of Patent: *Mar. 26, 2019

(54) METHOD FOR POWER SAVING IN MOBILE DEVICES BY OPTIMIZING WAKELOCKS

(71) Applicant: Seven Networks, LLC, Marshall, TX (US)

(72) Inventors: Ari Backholm, Los Altos, CA (US); Allan Hu, San Carlos, CA (US); Wei Li, San Carlos, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,896

(22) Filed: Oct. 19, 2017

Related U.S. Application Data

(63) Continuation of application No. 15/139,299, filed on Apr. 26, 2016, now Pat. No. 9,801,135, which is a
(Continued)

(51) Int. Cl.
*H04W 52/02* (2009.01)
*H04M 1/00* (2006.01)

(52) U.S. Cl.
CPC ... *H04W 52/0251* (2013.01); *H04W 52/0264* (2013.01); *Y02D 70/00* (2018.01)

(58) Field of Classification Search
CPC ...... G06F 1/3287; G06F 11/3466; G06F 1/28; G06F 11/0742; G06F 11/0751; G06F 11/079; G06F 11/0793; G06F 11/3409; G06F 11/3604; Y02D 10/171; Y02D 70/142; Y02D 70/23; Y02D 10/153; Y02D 10/174; Y02D 10/24; Y02D 10/34; Y02D 50/20; Y02D 50/40; Y02D 70/00;
(Continued)

(56) References Cited

U.S. PATENT DOCUMENTS 7,873,964 B2   1/2011 Huang et al.
8,155,625 B2 * 4/2012 Morgan ............ H04W 52/0258
                                              455/412.1
(Continued)

FOREIGN PATENT DOCUMENTS

CN          101895975 A      11/2010
CN          102129287 A       7/2011
(Continued)

OTHER PUBLICATIONS

Invalidity contentions of U.S. Pat. No. 9,351,254 in view of U.S. Pub. No. 2016/0048682 A1 to Gou.
(Continued)

*Primary Examiner* — Golam Sorowar
(74) *Attorney, Agent, or Firm* — NK Patent Law

(57) ABSTRACT

A method for conserving device and/or network resources is provided herein. The method includes detecting a wakelock operating on a mobile device and determining a consumption of one of a power or radio usage attributed to the detected wakelock. The method further includes determining a criticality related to user experience for the detected wakelock and releasing the detected wakelock based on the determined consumption and criticality. Related systems and mobile devices are also disclosed.

42 Claims, 11 Drawing Sheets

Related U.S. Application Data continuation of application No. 14/602,808, filed on Jan. 22, 2015, now Pat. No. 9,351,254.

(60) Provisional application No. 61/930,344, filed on Jan. 22, 2014.

(58) Field of Classification Search
CPC .......... Y02D 70/10; H04W 4/12; H04W 4/14; H04W 52/0212; H04W 52/0225; H04W 52/0229; H04W 52/0254; H04W 52/0258; H04W 52/0274; H04W 52/0277; H04W 52/028; H04W 68/005; H04W 72/0493; H04W 84/12; H04W 88/02
See application file for complete search history.

(56) References Cited

U.S. PATENT DOCUMENTS

| | | | | |
|---|---|---|---|---|
| 8,280,456 | B2 | 10/2012 | Hackborn et al. | |
| 8,332,500 | B1 | 12/2012 | Singleton et al. | |
| 8,417,300 | B2 | 4/2013 | Wong et al. | |
| 8,655,307 | B1 | 2/2014 | Walker et al. | |
| 8,838,086 | B2 | 9/2014 | Giaretta et al. | |
| 9,031,978 | B1* | 5/2015 | Beresniewicz | G06F 17/30941 707/770 |
| 9,043,433 | B2 | 5/2015 | Backholm et al. | |
| 9,122,735 | B2 | 9/2015 | Locker et al. | |
| 9,229,522 | B1 | 1/2016 | Tian et al. | |
| 9,264,868 | B2 | 2/2016 | Giaretta et al. | |
| 9,325,600 | B2 | 4/2016 | Alisawi et al. | |
| 9,727,124 | B2 | 8/2017 | Lee et al. | |
| 10,178,199 | B1 | 1/2019 | Nirantar et al. | |
| 2008/0148291 | A1 | 6/2008 | Huang et al. | |
| 2010/0216434 | A1 | 8/2010 | Marcellino et al. | |
| 2010/0293286 | A1 | 11/2010 | Nikkila et al. | |
| 2011/0040990 | A1* | 2/2011 | Chan | G06F 1/28 713/300 |
| 2011/0040996 | A1* | 2/2011 | Hackborn | G06F 11/3409 713/340 |
| 2011/0069089 | A1 | 3/2011 | Kopf et al. | |
| 2011/0119478 | A1 | 5/2011 | Jackson | |
| 2011/0131321 | A1 | 6/2011 | Black et al. | |
| 2011/0185202 | A1 | 7/2011 | Black et al. | |
| 2011/0223974 | A1 | 9/2011 | Agevik et al. | |
| 2012/0023190 | A1 | 1/2012 | Backholm et al. | |
| 2012/0023236 | A1 | 1/2012 | Backholm et al. | |
| 2012/0260118 | A1 | 10/2012 | Jiang et al. | |
| 2012/0272230 | A1 | 10/2012 | Lee | |
| 2012/0291102 | A1 | 11/2012 | Cohen | |
| 2012/0315960 | A1 | 12/2012 | Kim | |
| 2013/0138987 | A1 | 5/2013 | Wang | |
| 2013/0268257 | A1* | 10/2013 | Hu | G06F 17/5009 703/22 |
| 2013/0316769 | A1* | 11/2013 | Kim | H04W 52/0225 455/574 |
| 2013/0344859 | A1* | 12/2013 | Abramson | H04M 1/72577 455/418 |
| 2014/0038674 | A1* | 2/2014 | Srinivasan | H04W 52/0251 455/574 |
| 2014/0120961 | A1 | 5/2014 | Buck | |
| 2014/0137122 | A1 | 5/2014 | Egolf et al. | |
| 2014/0181560 | A1* | 6/2014 | Muralidhar | G06F 1/3265 713/323 |
| 2014/0195839 | A1 | 7/2014 | Chueh et al. | |
| 2014/0380075 | A1 | 12/2014 | Pulapaka et al. | |
| 2014/0380283 | A1* | 12/2014 | Hu | G06F 11/3604 717/132 |
| 2015/0095682 | A1* | 4/2015 | Lim | G06F 1/3206 713/323 |
| 2015/0141043 | A1* | 5/2015 | Abramson | G01C 21/34 455/456.1 |
| 2015/0143151 | A1* | 5/2015 | Yun | H04N 5/63 713/323 |
| 2015/0168174 | A1* | 6/2015 | Abramson | G01C 21/3697 701/408 |
| 2015/0233985 | A1* | 8/2015 | Chen | G01R 21/133 702/60 |
| 2015/0312404 | A1* | 10/2015 | Abramson | H04W 4/027 455/418 |
| 2016/0048682 | A1 | 2/2016 | Gou et al. | |

FOREIGN PATENT DOCUMENTS

| | | |
|---|---|---|
| CN | 102841672 A | 12/2012 |
| CN | 103064669 A | 4/2013 |
| CN | 103324519 A | 9/2013 |
| CN | 103402027 A | 11/2013 |
| EP | 2189008 A4 | 10/2013 |
| KR | 10-2012-0091551 A1 | 8/2012 |
| WO | WO2005089235 A3 | 9/2005 |

OTHER PUBLICATIONS

Invalidity contentions of U.S. Pat. No. 9,351,254 in view of U.S. Pub. No. 2013/0316769 A1 to Kim.
Invalidity contentions of U.S. Pat. No. 9,351,254 in view of "WakeScope: Runtime WakeLock anomaly management scheme for Android platform".
https://msdn.microsoft.com/en-us/library/windows/desktop/aa373208(v=vs.85).aspx.
Invalidity contentions of U.S. Pat. No. 9,351,254 in view of CN 103064669 A to Miao.
Invalidity contentions of U.S. Pat. No. 9,351,254 in view of Korean Patent Application Publication No. 10-2012-0091551 to Park.
Invalidity contentions of U.S. Pat. No. 9,351,254 in view of U.S. Patent Application Pub. No. 2014/0038674 to Srinivasan.
Invalidity contentions of U.S. Pat. No. 9,351,254 in view of U.S. Patent Pub. No. 2012/0272230 A1 to Lee.
Invalidity contentions of U.S. Pat. No. 9,351,254 in view of U.S. Pat. No. 9,229,522 to Tian.
Invalidity contentions of U.S. Pat. No. 9,351,254 in view of U.S. Pat. App. Pub. No. 2011/0040990 A1 to Chan.
Invalidity contentions of U.S. Pat. No. 9,351,254 in view of China Pat. App. Pub. No. CN 102129287 A to Min.
Invalidity contentions of U.S. Pat. No. 9,351,254 in view of "What is Keeping My Phone Awake" Article ("Pathak").
"What is keeping my phone awake? Characterizing and Detecting No-Sleep Energy Bugs in Smartphone Apps," by A. Pathak et al. (MobiSys'12, Jun. 25-29, 2012, Low Wood Bay, Lake District, UK).
Invalidity contentions of U.S. Pat. No. 9,351,254 in view of China Pat. App. Pub. No. CN 103402027 A to Zhang.
Invalidity contentions of U.S. Pat. No. 9,351,254 in view of Sony's Battery Stamina Mode ("Sony").
"Flow Sony's Battery Stamina Mode works" available at https://developer.sonymobile.com/2013/04/03/how-sonys-batterystamina-mode-works/ (Apr. 3, 2013) ("How Stamina Works").
Sony, "Xperia™ Z—Intelligent battery life management," available at https://www.youtube.com/watch?v=Xa86stGHO4&feature=youtu.be (Jan. 9, 2013) ("Xperia").
"Learn about Extended Standby Mode, Sony's new power save feature [video]," available at https://developer.sonymobile.com/2012/10/05/learn-about-extended-standby-mode-sonys-new-power-save-feature-video/ ("Extended Standby Mode").
Invalidity contentions of U.S. Pat. No. 9,351,254 in view of Deep Sleep Battery Saver ("AntTek").
"How Deep sleep Battery Saver works" available at https://forum.xda-developers.com/showthread.php?t=2030696 ("DS XDA") (Dec. 2, 2012).
"XDA Xposed Tuesday: Deep Sleep Battery Saver," available at https://youtube/CzcGBwsUwho ("DS Video").
"Deep Sleep Battery Saver: Save battery life upto 40%," available at http://www.anttek.com/battery-saver ("DS Webpage").
"Deep Sleep Battery Saver," available at https://play.google.com/store/apps/details?id=com.rootuninstaller.batrsaver ("DS Play App").

(56) References Cited

OTHER PUBLICATIONS

5 Great Battery Saving Apps to Extend Your Android Phone's Life, available at http://trendblog.net/5-great-battery-saving-apps-for-android-phones-to-extend-your-android-phone-life/ (Sep. 2, 2013) ("DS Blog").
"Extend Android Battery Life With Deep Sleep Battery Saver," available at https://www.addictivetips.com/android/extend-androidbattery-life-with-deep-sleep-battery-saver/ (Dec. 14, 2012) ("DS Extend").
Invalidity contentions of U.S. Pat. No. 9,351,254 in view of "Reducing Power Consumption Using Improved Wakelock on Android Platform" by Joonkyo Kim et. al.
"How to Reclaim your Android Device's Battery Life with Greenify! (Install, Setup, and Tutorial)," available at https://www.youtube.com/watch?v=5J3CCpxJBuE&feature=youtu.be (Jan. 30, 2014).
Invalidity contentions of U.S. Pat. No. 9,351,254 in view of U.S. Pub. No. US 2010/0216434 A1 to Marcellino.
Invalidity contentions of U.S. Pat. No. 9,351,254 in view of GoS 360° System.
GoS 360° website (May 7, 2012) ("GoS Website"), available at http://web.archive.org/web/20120507212809/http://www.gosnetworks.com:80/
GoS Networks, "A guide to cost-effective next generation services" ("GoS Guide"), available at http://web.archive.org/web/20120118090200/http://www.gosnetworks.com/images/documentation/gos-booklet.pdf (Aug. 2011).
"How to Deliver Outstanding Customer Service Support" ("GoS Customer Service"), available at http://blog.gosnetworks.com/how-todeliver-outstanding-customer-service-support/ (Jun. 27, 2012).
FAQ for Greenify users, available at https://plus.google.com/112105199234363320140/posts/Gz4TB2fAUV5 (Feb. 18, 2013).
App Report for Greenify (Donation Package), available at https://www.mobileaction.co/app/android/us/greenify-donationpackage/com.oasisfeng.greenify.pro.
GoS 360°—"Enabling End-to-End Policy Control Architecture" (GoS Architecture), available at http://www.gosnetworks.com/products/end-to-end-policy-control-architecture.
XDA Community Apps, Greenify, "[APP][4.1+]Greenify v2.9 Final (Updated on Aug. 1)" available at https://forum.xda-developers.com/showthread.php?t=2155737 (Feb. 19, 2013).
Invalidity contentions of U.S. Pat. No. 9,351,254 in view of Greenify Application ("Greenify").
Allen, Mitch, Palm® webOS™, Book, 2009, pp. 1-20, O'Reilly Media, Inc., Sebastopol, CA, USA.
Exhibit 254-A20 Invalidity Contentions of U.S. Pat. No. 9,351,254 in View of GreenPower (May 10, 2018).
Exhibit 254-A19 Invalidity Contentions of U.S. Pat. No. 9,351,254 in View of China Pat. App. Pub. No. CN 102841672 A (May 10, 2018).
App Log, "Green Power Android App Review," available at https://web.archive.org/web/20121102013813/http://www.androidapplog.com/2012/10/android-app-reviews/green-power-saver-for-android/ (Nov. 2, 2012).
"Welcome to GreenPower," available at https://web.archive.org/web/20130527140618/http://batterysaverapp.com:80/ (May 27, 2013).
"User Guide," available at https://web.archive.org/web/20130824033813/http://batterysaverapp.com:80/index.php/user-guide (Aug. 24, 2013).
Screen-shots from "How it works: GreenPower free battery saver," available at https://www.youtube.com/watch?v=o1YRtC2_WLc (Aug. 15, 2013).
Select pages from Claim Construction Order; *Seven Networks, LLC v. ZTE (USA), Inc. and ZTE Corporation*; Case 3:17-cv-01495-M; Document 207; Filed Oct. 23, 2018 ('127 Patent).
Select pages from Claim Construction Memorandum and Order; *Seven Networks, LLC v. Google LLC*; *Seven Networks, LLC v. Samsung Electronics America, Inc. and Samsung Electronics Co., Ltd.*; Case 2:17-cv-00442-JRG; Document 342; Filed Oct. 23, 2018 ('127 Patent).
Nov. 15, 2017 *Seven v. Google & Samsung Invalidity Cover Pleading EDTXL*: Civil Action No. 2:17-cv-00442-JRG; Civil Action No. 2:17-cv-00441s-JRG.
Exhibit 254-B to Invalidity Contentions Civil Action No. 2:17-cv-00442-JRG; Civil Action No. 2:17-cv-00441s-JRG.
Exhibit C to Civil Action No. 2:17-cv-00442-JRG; Civil Action No. 2:17-cv-00441s-JRG.
USPTO, Office Action in U.S. Appl. No. 15/344,588 dated Jun. 15, 2018.
Select pages from Claim Construction Order; *Seven Networks, LLC v. ZTE (USA), Inc. and ZTE Corporation*; Case 3:17-cv-01495-M; Document 207; Filed Oct. 23, 2018.
Select pages from Claim Construction Memorandum and Order; *Seven Networks, LLC v. Google LLC*; *Seven Networks, LLC v. Samsung Electronics America, Inc. and Samsung Electronics Co., Ltd.*; Case 2:17-cv-00442-JRG; Document 342; Filed Oct. 23, 2018.
"Wakelock Detector-Save Battery", play.google.com/store/apps/details?id=com.uzumapps.wakelockdetector&hl=en, Last accessed Feb. 17, 2015, 3 pages.
"Wakelocks", forum.xda-deyelopers.com/wiki/Wakelocks, Last accessed Feb. 17, 2015, 3 pages.
IPR2018-01124—Petition for Inter Partes Review of U.S. Pat. No. 9,351,254.
IPR2018-01125—Petition for Inter Partes Review of U.S. Pat. No. 9,351,254.
IPR2018-01116—Petition for Inter Partes Review of U.S. Pat. No. 9,351,254.
IPR2018-01117—Petition for Inter Partes Review of U.S. Pat. No. 9,351,254.
USPTO, Notice of Allowance in U.S. Appl. No. 15/34,588 dated Nov. 30, 2018.
USPTO Issue Notification; U.S. Appl. No. 15/344,588; U.S. Pat. No. 10,178,199; Dec. 19, 2018; p. 1.
Robert J. Weinschenk, Case IPR2018-01116; U.S. Pat. No. 9,351,254 B2; *Google LLC*, Petitioner, v. *Seven Networks, LLC*, Patent Owner, Decision Institution of Inter Partes Review 35 U.S.C. § 314(a); Nov. 19, 2018; pp. 1-33.
Thomas L. Giannetti, Case IPR2018-01117; U.S. Pat. No. 9,351,254; *Google LLC*, Petitioner, v. *Seven Networks, LLC*, Patent Owner, Decision Institution of Inter Partes Review 35 U.S.C. § 314(a); Nov. 19, 2018; pp. 1-41.
Robert J. Weinschenk, Case IPR2018-01124; U.S. Pat. No. 9,351,254 B2; *Samsung Electronics Co., Ltd. and Samsung Electronics America, Inc.*, Petitioner, v. *Seven Networks, LLC*, Patent Owner; Decision Institution of Inter Partes Review 35 U.S.C. § 314(a); Dec. 10, 2018; pp. 1-34.
Robert J. Weinschenk, Case IPR2018-01125; U.S. Pat. No. 9,351,254 B2; *Samsung Electronics Co., Ltd. and Samsung Electronics America, Inc.*, Petitioner, v. *Seven Networks, LLC*, Patent Owner; Decision Institution of Inter Partes Review 35 U.S.C. § 314(a); Dec. 10, 2018; pp. 1-27.

* cited by examiner

METHOD FOR POWER SAVING IN MOBILE DEVICES BY OPTIMIZING WAKELOCKS

CROSS-REFERENCE TO RELATED APPLICATIONS

This application is a continuation of U.S. Utility patent application Ser. No. 15/139,299 filed on Apr. 26, 2016 entitled "METHOD FOR POWER SAVING IN MOBILE DEVICES BY OPTIMIZING WAKELOCKS", being issued as U.S. Pat. No. 9,801,135 on Oct. 24, 2017, which is a continuation of U.S. Utility patent application Ser. No. 14/602,808 filed on Jan. 22, 2015 entitled "Method for Power Saving in Mobile Devices by Optimizing Wakelocks", now U.S. Pat. No. 9,351,254 issued on May 24, 2016, which claims priority to U.S. Provisional Patent Application No. 61/930,344 filed on Jan. 22, 2014 entitled "Method for Power Saving in Mobile Devices", the contents of all of which are incorporated by reference herein.

BACKGROUND

Wakelocks are power-managing software programs that may, in certain circumstances, prohibit a mobile device from going into deep dormancy. The wakelock may be provided to, for example, keep certain applications executing on the mobile device or communicating with a network resource. Unfortunately, the wakelocks can cause unnecessary power drain of a mobile device.

Determining which wakelocks are important or useful can be difficult, such that a user, if they wanted to disable certain wakelocks would not be able to effectively determine which wakelocks may or may not have an impact on user experience.

SUMMARY

In accordance with one or more embodiments, a method is provided that includes detecting a wakelock operating on a mobile device; determining a consumption of one of a power or radio usage attributed to the detected wakelock; determining a criticality related to user experience for the detected wakelock; and releasing the detected wakelock based on the determined consumption and criticality.

In accordance with one or more embodiments, releasing the detected wakelock based on the determined consumption and criticality includes releasing the detected wakelock if the determined criticality and determined consumption are not within predetermined ranges.

In accordance with one or more embodiments, the method includes determining if a detected wakelock is native or non-native to the mobile device.

In accordance with one or more embodiments, detecting a wakelock includes detecting a wakelock at predetermined intervals.

In accordance with one or more embodiments, determining a criticality related to user experience includes determining that a wakelock is unnecessary for operation of the mobile device.

In accordance with one or more embodiments, determining a criticality related to user experience includes determining a criticality on an application-by-application basis.

In accordance with one or more embodiments, when only wakelocks below a predetermined criticality are detected, a method includes releasing any wakelocks that are native to the mobile device.

In accordance with one or more embodiments, when wakelocks above a predetermined criticality are detected, a method includes continue detecting wakelocks operating on the mobile device.

In accordance with one or more embodiments, a method includes detecting wakelocks operating on the mobile device at a subsequent time, and monitoring changes between the detected wakelocks and subsequently detected wakelocks.

In accordance with one or more embodiments, a method includes restoring released native wakelocks if the subsequently detected wakelocks are above the predetermined criticality.

In accordance with one or more embodiments, a method includes monitoring changes comprises identifying patterns of previously detected wakelocks. The patterns are stored within a cache of the mobile device.

In accordance with one or more embodiments, a mobile device is provided. The mobile device includes a native wakelock observer module configured for detecting a native wakelock operating on the mobile device, a wakelock monitor module configured for monitoring one or more detected wakelocks operating on the mobile device, and an application wakelock detection module configured for detecting an application induced wakelock operating on the mobile device. The wakelock monitor module releases a detected wakelock based on a determined consumption and criticality associated with the detected wakelock.

In accordance with one or more embodiments, a mobile device is provided. The mobile device includes computer control code that when executed by a processor on the mobile device causes the mobile device to detect a wakelock operating on a mobile device, determine a criticality related to user experience for the detected wakelock, and release a detected wakelock based on the determined criticality.

DETAILED DESCRIPTION

Figure 1A:
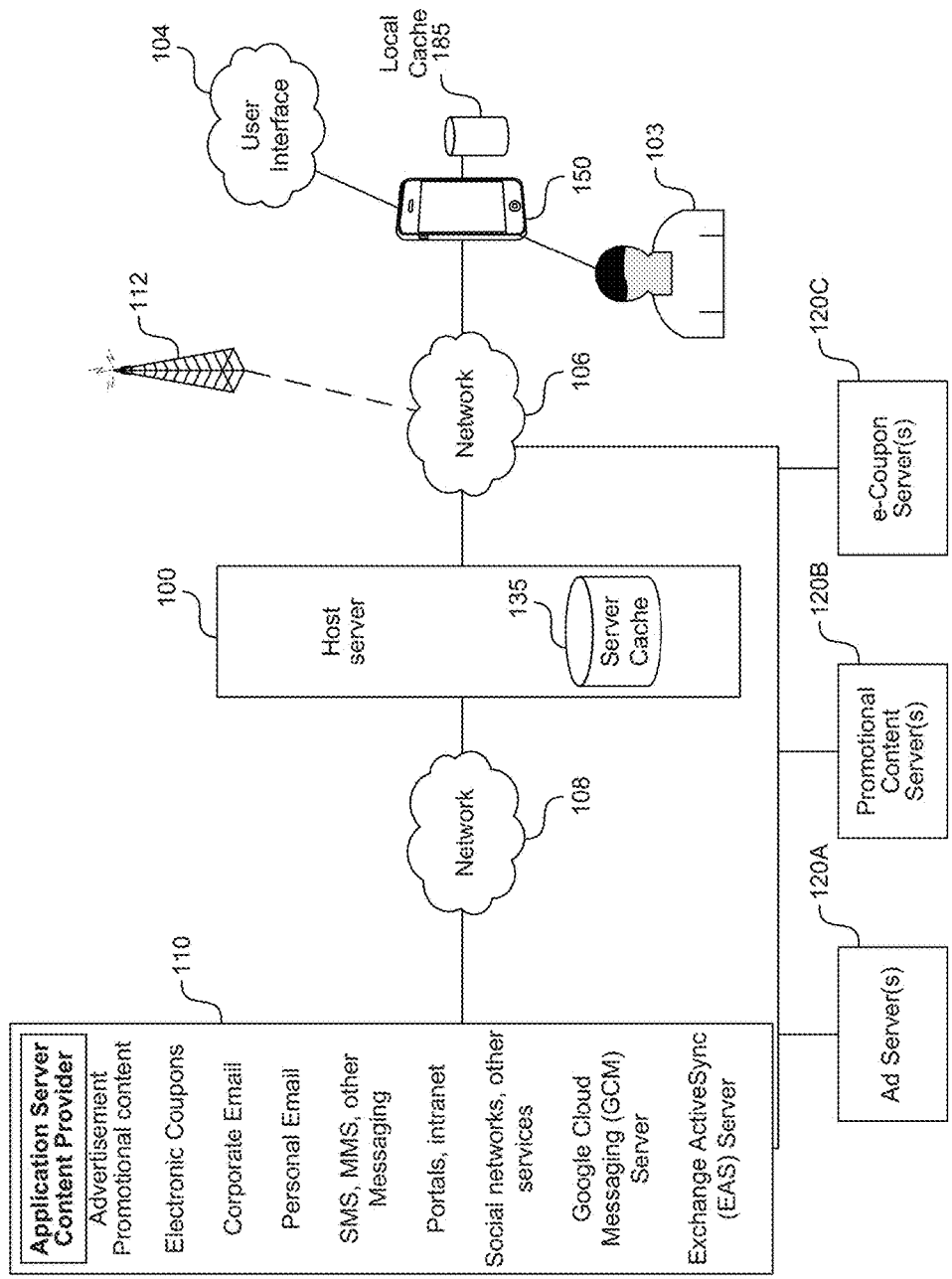
FIG. 1A illustrates an example diagram of a system where a host server facilitates management of traffic, content caching, and/or resource conservation between mobile devices (e.g., wireless devices), an application server or content provider, or other servers such as an ad server, promotional content server, an e-coupon server or messaging servers such as the Google Cloud Messaging (GCM) server and the Exchange ActiveSync (EAS) server in a wireless network (or broadband network) for resource conservation. The host server can further optimize signaling in a wireless network and conserver battery resources based on protocol layer optimization techniques.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

As used herein, a "module," "a manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

A Central Processing Unit (CPU) is one of the main drivers of battery consumption in mobile devices. System platforms typically have elaborate mechanisms to manage the CPU to minimize the power consumption. These include, for example, (1) managing the number of CPU cores running at a given time, (2) frequency of the CPU cores, and (3) setting CPU to deep sleep, effectively all but shutting it down.

Given that applications are executing their code all of the time even if there is no critical need for it, Android devices differ from many other computing platforms, introducing a concept where platform can decide at any point (except when screen in ON) to put CPU to deep sleep, even during an active code execution.

Applications can request wakelocks when they need to be certain that they execute the code. The wakelocks guarantee that CPU is not put to deep sleep while a wakelock is held. However, this has led to applications acquiring wakelocks even when they are not needed, and errors in applications causing wakelocks not to be released in time, causing additional power consumption. Similarly, bugs or misbehavior that cause busy loops trigger the platform tools to raise frequency and fire up more CPU cores, which also leads to higher power consumption.

Embodiments of the present disclosure include systems and methods for managing power consumption when applications behave in a way that is not optimal for power consumption.

Embodiments disclosed herein include mechanisms to:
Identify badly behaving applications and their specific bad behavior,
Terminate these applications, their wakelocks or adjust CPU parameters, and
Perform these operations with Minimum impact to user experience.

In one embodiment, a wakelock optimizer (which may be implemented in software or hardware) is used to identify bad behavior. Such bad behavior can be long or frequent use of wakelocks, without which the user experience would still be preserved. For example, a version of Skype acquires a wakelock for 3 minutes every 20 minutes while it is exchanging non-urgent communication with its server. These wakelocks can account for as much as 25% of all power consumed in the device when it is idle, or put the other way around, can extend battery life by 33% when terminated. That is, three (3) minutes of 50 mA every 20 minutes can be equivalent to 7.5 mA or more (for Skype alone). Another example is CarrierIQ client that is used to collect troubleshooting data from the mobile devices. It occasionally acquires a wakelock and never releases it. This can double the power consumption even when device is not otherwise used.

Unnecessary wakelocks are identified as such that are not necessary for operations that have end user impact, or the other way—wakelocks that when removed don't cause difference in end user experience for the application.

In some embodiments, a wakelock optimizer is disclosed. The wakelock optimizer can identify targeted wakelocks for specific applications. The targeted wakelocks and applications are such that they are considered unnecessary or potentially unnecessary based on the pre-determined criteria.

In some embodiments, the wakelock optimizer monitors such wakelocks, and once they are observed to be acquired, releases the system wakelock (which is the actual wakelock controlling the CPU wakeup state, and is triggered by the wakelocks set by the applications) while monitoring whether any other, non-targeted, wakelock is acquired, and restore the system wakelock if they are. The wakelock optimizer also considers end user activity and screen state as parameters to restore the system wakelock if needed. Identification which wakelock caused the system wakelock to get set can be achieved through, for example, using "dumpsys-power" command in Android platform. As executing the dumpsys command consumes power by itself, it may be triggered only after a grace period—after a wakelock has been held for X seconds.

In some embodiments, the wakelock optimizer may monitor CPU activity and trigger lower CPU frequency, shutting down one or more of the CPU cores, or termination of an application that exceeds CPU usage threshold while the device is not actively used by the user. The wakelock optimizer may also include restarting the terminated application either immediately, after a delay, or triggered by an external event, to preserve user experience.

In some embodiments, applications may acquire a wakelock to ensure they can access the network in timely manner, as each network access has a power tail and it is more efficient to make sure all network accesses happen aligned together, rather than spread across time. In such case, releasing the wakelock during such burst of network activity may extend the period of network access and cause additional power consumption. Here, it can be beneficial to combine wakelock and CPU optimization with optimizing the network access. For example, to achieve power savings for Skype, wakelock optimization is beneficial to be combined with protocol offload to keep Skype from keep turning radio on when it cannot hold wakelock and the network transactions are spread wider over time.

In some embodiments, as determining which wakelock is being held consumes power by itself (executing "dumpsys-power" in this embodiment), the wakelock optimizer (e.g., solution described in ASVM-22489) may have a delay after identifying that there is a wakelock, before querying which wakelock it is. This can indicate an inability to target short, but frequent wakelocks (as at the moment when the specific wakelock is being queried, short wakelock would have already been released).

Thus, in some embodiments, the wakelock optimizer uses caching related algorithms to identify patterns and periodicity in wakelocks—to initially make queries more aggressively to find out patterns of wakelocks, and when a wakelock (without knowing which specific wakelock is being held) matches a pattern that is known to be caused by a targeted wakelock, either (a) the query is done earlier as probability that the wakelock is a targeted one is higher, or (b) the wakelock is released without querying, in case the probability is above a defined high threshold.

This process allows targeting shorter, but frequent wakelocks. A simple example of such is Network Location Provider wakelock held by Google's Android Services Framework, which lasts 5 seconds every minute. The analysis and determination of user experience impacts is naturally performed before determining whether each of these periodic wakelocks are "targeted" or not.

Socket Closures

A session-based protocol such as TCP includes a setup and tear down (or closure or termination) of the session. Within the session, zero or one or more higher level (e.g., HyperText Transfer Protocol or HTTP) transactions can take place. In a fixed line Internet or Wi-Fi, timing of the eventual socket closure does not carry a cost. But in a mobile Internet (i.e., wireless data service that allows users to connect to the Internet from a device connected to a cellular carrier or operator's data network or mobile network), sending any data over the mobile network involves cost on lower levels (i.e., at the Radio Network Controller (RNC) or radio layer) in bringing the lower level connection available for transmission of data packets for socket closure (TCP FIN or TCP RST packet). In other words, socket closures can trigger Radio Resource Control (RRC) connection to be established between the mobile device and the network, which involves signaling (i.e., exchange of messages) between the mobile device and the network.

The disclosed systems and methods can optimize the signaling caused by the socket closure.

In one embodiment, the disclosed systems and methods can optimize application-initiated socket closures. An application may close a session when the underlying radio connection is down (or idle). Typically, the session is closed after a delay following an actual higher level transaction (e.g., HTTP transaction) to allow a potential subsequent transaction to reuse the same session. When the application closes the session when the radio is idle, the session closure triggers the radio to get connected and causes signaling. In an event of an application-initiated socket closure, a local proxy (e.g., local proxy 175 of FIG. 1B, 275 of FIG. 2A) in the mobile device can acknowledge and close the socket towards the application, but delay the network side socket closure until radio comes up for other reasons, effectively aligning the socket closure to such other traffic. Consequently, signaling in the mobile network due to application-initiated socket closures is optimized.

In some cases a server may initiate a socket closure after an application has closed the socket, but the socket closure has been delayed by the local proxy, as described above. This would mean that to achieve signaling reduction, the session closure needs to be addressed also as a server-initiated socket closure.

A server with which an application has established a session may close the session by its own initiative. Servers typically close idle sessions (i.e., when there is no traffic) to conserve its resources, which are at least partially a function of number of open sessions from client applications. For example, a server may close idle sessions after four minutes if there is no traffic over such session. Such closure may cause a radio on a mobile device to go up. Further, because such transmission is server-initiated, it involves more radio/RNC signaling as the network needs to page the mobile device to trigger initiation of the radio connection.

In one embodiment, the server-initiated closures are addressed through a combination of implementing a server-side proxy (e.g., proxy server 125 of FIG. 1B or a proxy server that resides on or is associated with a carrier network) and the local proxy 175 (which aligns socket closure with other outgoing traffic) since the mobile application will eventually close the session. The proxy server can, for example, intercept and drop TCP RST packets. In one implementation, the local proxy 175 may proactively close the session towards the application and delay the socket closure towards the server until radio comes up, in case it is needed for conserving resources (open sockets/sessions) in the device.

In another embodiment, these server-initiated closures are addressed by closing both network and application side sockets proactively when the radio is up (or connected or powered on) to avoid a subsequent server-initiated closure to bring the radio up. The server and application side closures can be managed to achieve a balance between reduction of signaling by closing the socket early without additional signaling impact, and overhead to establish an additional session in case the application would reuse the session before it would have been closed without the proactive closure. The additional sessions do not cause signaling impact, but they add traffic (bytes) transferred over the network. Examples of methods for closing both network and application side sockets proactively are described in detail below.

(1) An example method involves closing all sockets immediately after a transaction is identified to be complete (e.g. HTTP, HTTPS transaction). As the radio is already up (i.e., connected or powered) at the end of the transaction, the closure would not cause additional signaling.

(2) Another example method involves identifying specific user, application, host, port, protocol, content type and/or other parameters and/or combinations thereof where the reuse of the socket is zero or minimal and applying the example method (1) described above to those combinations only (or exclude combinations with high reuse), so that the overhead is minimized. This identification can be done, for example, online (or in real time or near real time) in the local proxy 275, or offline for one or more users.

(3) Another example method involves identifying optimal parameters X, Y and Z for user/application/host/port/etc., combinations, where X indicates seconds from the proactive socket closure to next transaction(s) (transaction count of Z) in the same scope (app/host/port/etc.), and Y indicates minutes to hold off from implementing the example method (1) if Z transactions occurred in X seconds after the proactive socket closure. This allows to establish a safeguard to avoid closing sockets frequently in case a socket is reused multiple times. In some observations, same socket is observed to be used, for example, 800 times in one second intervals. This identification of the optimal parameters can be done, for example, online in the client or local proxy 175, or offline for one or more users.

(4) Yet another example method involves identifying optimal delay K for a given user/application/host/port/etc., that is shorter that the server delay for closing the session, and then performing a delayed socket closure (e.g., using method (1)) once the radio comes up (or is connected or powered on) next time. This identification of the optimal delay can be done, for example, online in the client proxy, or offline for one or more users.

Embodiments of the present disclosure further include systems and methods for managing signaling in a wireless network (e.g., mobile network) and power consumption by utilizing protocol layer optimization techniques or strategies. Protocol layer optimization techniques include TCP (Transmission Control Protocol) layer optimization techniques for reducing signaling in a mobile network, and conserving battery resources on mobile devices.

In one embodiment, a protocol layer optimization technique includes deferring TCP socket closures. When an application on a mobile device closes its TCP socket while a radio on the mobile device is down (i.e., powered down), a local proxy residing in the mobile device can defer the closure of the TCP socket until the radio comes up for other reasons (e.g., when there is user interactive traffic, backlight on the mobile device turns on). By preventing the radio from turning on just to close a TCP socket, the local proxy thus avoids unnecessary signaling and conserves battery resources.

In another embodiment, a protocol layer optimization technique includes closing network sockets with a TCP RST packet (resets a network connection) instead of a TCP FIN packet (terminates the network connection). Normally, when an application requests a socket closure, a four-handshake occurs to allow each side to terminate its connection. The TCP stack on the device side sends a FIN packet, and a corresponding server TCP stack responds with an ACK packet and a FIN packet. The TCP stack on the device side then responds with an ACK packet. When any of these packets get lost in the network, the device stack autonomously (without the application knowing about it) keeps retrying by sending FIN/ACK packets with increasing back off algorithm, which can result in large number of retries (e.g., over 10 retries), with each retry turning the radio on unnecessarily. The local proxy on the mobile device can avoid this drawback by closing the network socket with a TCP RST packet, which does not require an acknowledgement back, and does not get retried. Similarly, when the server closes the socket to the device, server TCP stack typically sends a FIN packet. The local proxy can then respond with an TCP RST packet instead of FIN/ACK packets to avoid FIN/ACK retry loops. This results in savings in signaling and battery resources, particularly in unreliable mobile networks or during time periods when a mobile network is congested, and TCP packets are likely to get dropped or lost in the network.

In yet another embodiment, a protocol layer optimization technique includes a mechanism to stop or reduce the number of retries a TCP stack on a device side makes in an attempt to establish connection. Normally, to establish a connection, the TCP stack sends a SYN packet, to which the server responds with a SYN-ACK, and finally the device TCP stack responds with an ACK packet. However, when an application attempts to open a new socket in poor network conditions, the TCP stack keeps retrying the TCP SYN packet to open the socket by sending SYN/ACK packets with back-off retry algorithm. In one implementation, the local proxy on the mobile device detects when the application has timed out (e.g., from application level timers) and is not expecting a response anymore, and then modifies the TCP stack to stop it from retrying to open the socket. Thus, being aware of the application timeout allows the local proxy to prevent unnecessary signaling and conserve battery resources.

In some implementations, the local proxy can establish a separate timer to retry less, even if the application has not timed out. The local proxy can do so when, for example, based on an algorithm, the local proxy recognizes or determines that the socket is not going to get opened. Such determination may be based on, for example, status of the destination server (e.g., destination server is down, and does not respond), network conditions (e.g., congestion), and the like.

In a further embodiment, a protocol layer optimization technique includes multiplexing of all TCP sockets in a mobile device through a single socket over a wireless (e.g., mobile network). The local proxy of the mobile device can utilize this multiplexing technique to reduce the TCP/IP overhead and achieve signaling and battery savings. Particularly in poor network conditions, the multiplexing technique can result in significant savings in signaling and battery resources since retransmissions for individual socket opening/closures are reduced.

In another embodiment, a protocol layer optimization technique includes blocking application traffic at a mobile device to prevent both TCP and application level retries to attempt to establish a connection. When firewalling mechanisms are established on the network side, both the device TCP stack and the application will keep retrying to establish a failed connection (or individual packets, in case of UDP (User Datagram Protocol)). Furthermore, the retry algorithms have typically been designed to be aggressive, to restore user experience as quickly as possible. As a result, such network-side firewalling mechanisms cause significant battery drain and additional signaling.

The disclosed system has advantages over such network-side firewalling mechanisms. The disclosed system includes a local proxy that acts as a firewall to effectively or efficiently block application traffic at the device, and avoid both TCP and application level retries to save on signaling and battery resources. This helps avoid network requests, TCP and application level retries and additional battery drain and signaling. In some embodiments, the firewall feature of the local proxy may be used for creating service plans that only allow specific applications to be used, and can block other application traffic. In other embodiments, the firewall feature of the local proxy may be used for directing application traffic to operator-friendlier push mechanisms. For example, application traffic can be offloaded to the Google Cloud Messaging channel.

The local proxy can avoid or prevent TCP and application level retries using various methods. For example, the local proxy can either "drop" or "reject" TCP connections from an application, based on compatibility with the application. For example, some applications react better to the "reject" mechanism, where the source TCP socket receives ICMP (Internet Control Message Protocol) Destination Not Available (or destination unreacheable) message, and realize that the wireless network is working or fine and is not the cause of the rejection of the TCP connection, and most likely the problem is with the application server. However, some applications (e.g., Skype) respond to the ICMP messages immediately by retrying alternative ports and servers, and behave better if their packets are "dropped" (i.e., not responded to at all). In one implementation, the disclosed system can analyze application responses to "dropped" or "rejected" TCP connections in real time and select a suitable blocking mechanism to minimize retry attempts locally at the mobile device. In another implementation, the disclosed system can analyze in advance application behavior or response to these blocking mechanisms, and select and associate with each application a suitable blocking mechanism that can be applied when TCP connections are to be blocked. Application of these blocking mechanisms locally at the device side by the local proxy allows the mobile device to avoid or minimize retries, and thus save on battery and signaling resources.

In addition to the application traffic blocking on the device side via the local proxy, in some embodiments, the proxy server, and/or a network-side proxy (e.g., a proxy residing in the operator network) may also perform blocking of server initiated traffic (e.g., block unnecessary FIN/ACK packet), and/or provide safe response (e.g., FIN/ACK packets or other cached responses) from the proxy server and/or the network-side proxy to keep the servers happy.

In addition to TCP, the disclosed protocol layer optimization techniques may be applicable to other protocols such as UDP, SCTP (Stream Control Transmission Protocol), and the like.

In some embodiments, the signaling optimization methods, including socket closure methods and/or the protocol layer optimization techniques described above, may be implemented on a local proxy 175/275. In other embodiments, the signaling optimization methods may be implemented on or integrated with operating systems (OS) of client devices. For example, OS manufacturers can implement the disclosed signaling optimization methods in their operating systems. In some implementations, device manufacturers that utilize their own operating systems can include the disclosed signaling optimization methods in their operating systems. Some device manufacturers can also modify or customize third-party operating systems to include the disclosed signaling optimization methods. Inclusion or implementation of the disclosed signaling optimization methods by OS manufacturers and/or device manufacturers in operating systems enable devices with such operating systems to more effectively reduce signaling and conserve battery resources. Operating systems can include any operating systems including but not limited to, any previous, current, and/or future versions/releases of, Windows Mobile, iOS, Android, Symbian, Palm OS, Brew MP, Java 2 Micro Edition (J2ME), Blackberry, and the like.

FIG. 1A illustrates an example diagram of a system where a host server 100 facilitates management of traffic, content caching, and/or resource conservation between mobile devices 150 (e.g., wireless devices), an application server 110 or content provider, or other servers such as an ad server 120A, promotional content server 120B, an e-coupon server 120C or messaging servers such as the Google Cloud Messaging (GCM) server and the Exchange ActiveSync (EAS) server in a wireless network (or broadband network) for resource conservation. The disclosed system can further optimize signaling in a wireless network and conserver battery resources based on protocol layer optimization techniques.

The client devices 150 can be any system and/or device, and/or any combination of devices/systems that is able to establish a connection, including wired, wireless, cellular connections with another device, a base station 112, a server and/or other systems such as host server 100 and/or application server/content provider 110. Client devices 150 will typically include a display and/or other output functionalities to present information and data exchanged between among the devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120a, promotional content servers 120b, and/or e-Coupon servers 120c as application servers or content providers are illustrated by way of example.

For example, the client/mobile devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, any tablet, a phablet (a class of smart phones with larger screen sizes between a typical smart phone and a tablet), a handheld tablet (e.g., an iPad, the Galaxy series, the Nexus, the Kindles, Kindle Fires, any Android-based tablets, Windows-based tablets, or any other tablet), any portable readers/reading devices, a hand held console, a hand held gaming device or console, a head mounted device, a head mounted display, a thin client or any SuperPhone such as the iPhone, and/or any other portable, mobile, hand held devices, or fixed wireless interface such as a M2M device, etc. In one embodiment, the client devices 150 (or mobile devices 150), host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience. The host server 100 may also indirectly manage traffic via creation, selection and/or deployment of traffic blocking policy for implementation on the mobile device in some embodiments.

For example, in context of battery conservation, the device 150 can observe user activity (for example, by observing user keystrokes, backlight status, or other signals via one or more input mechanisms, etc.) and alters device 150 behaviors. The device 150 can also request the host server 100 to alter the behavior for network resource consumption based on user activity or behavior.

In one embodiment, the traffic management for resource conservation and/or maintaining of server stability in signaling optimization is performed using a distributed system between the host server 100 and client device 150. The distributed system can include proxy server and cache components on the server side 100 and on the device/client side, for example, as shown by the server cache 135 on the server 100 side and the local cache 185 on the client 150 side. In one embodiment, the traffic management for reducing signaling in the network and reducing or alleviating network congestion can be implemented on the mobile device 150 without any support from the server-side proxy or other network-side components.

Functions and techniques disclosed for context aware traffic management and providing server stability for resource conservation and reducing or optimizing signaling in networks (e.g., network 106 and/or 108) and devices 150, reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1B. Functions and techniques performed by the proxy and cache components in the client device 150 and the related components therein are described, respectively, in detail with further reference to the examples of FIG. 2.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 include any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1B:
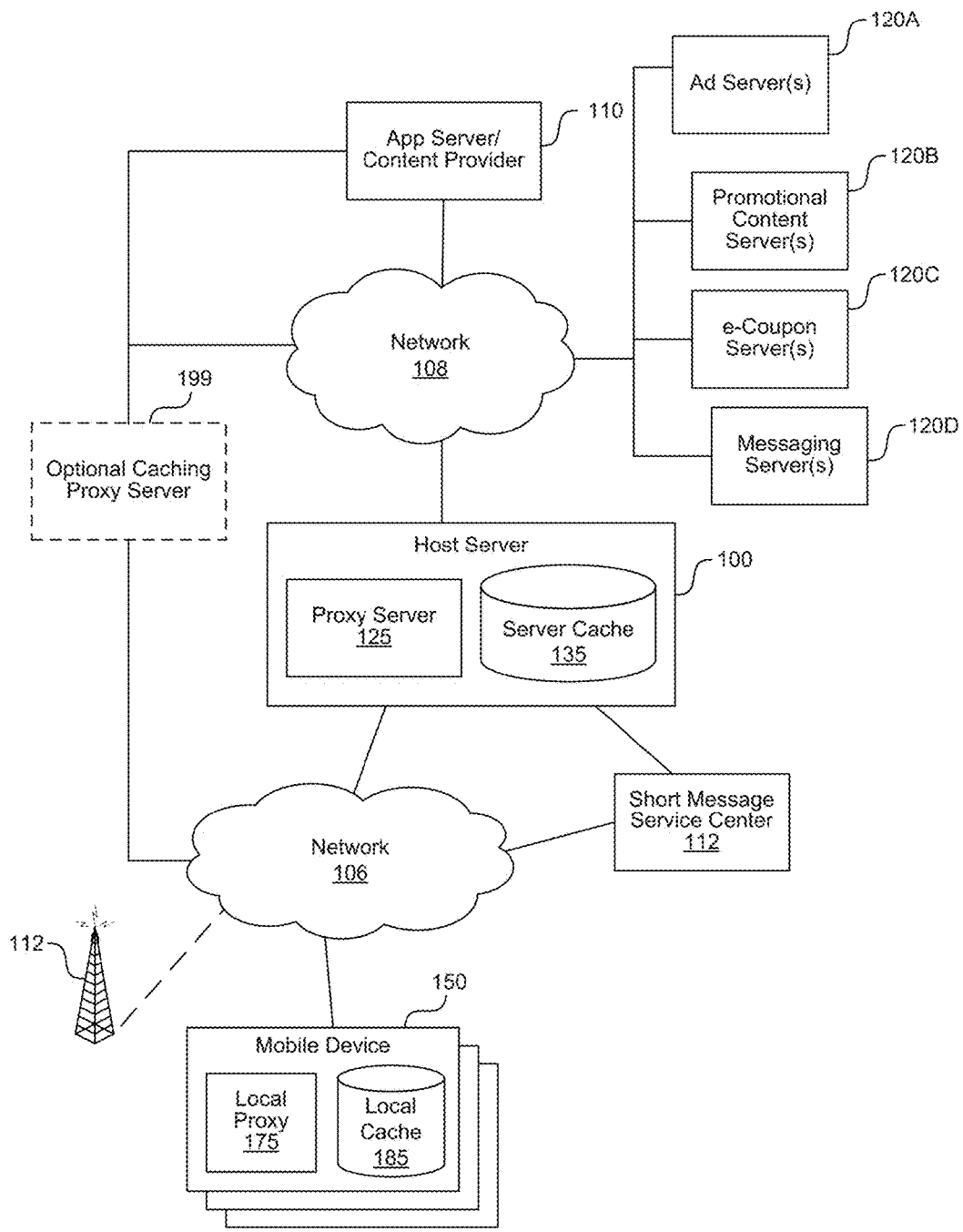
FIG. 1B illustrates an example diagram of a proxy and cache system distributed between the host server and device which facilitates network traffic management between a device, an application server or content provider, or other servers such as an ad server, promotional content server, an e-coupon server or messaging servers such as the GCM server and the EAS server for resource conservation and content caching. The proxy system distributed among the host server and the device can further optimize signaling in a wireless network and conserver battery resources based on protocol layer optimization techniques.

FIG. 1B illustrates an example diagram of a proxy and cache system distributed between the host server and device which facilitates network traffic management between a device, an application server or content provider, or other servers such as an ad server, promotional content server, an e-coupon server or messaging servers such as the GCM server and the EAS server for resource conservation and content caching. The distributed proxy system can further optimize signaling in a wireless network and conserver battery resources based on protocol layer optimization techniques.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, e-Coupon servers 120C, and/or messaging servers (e.g., GCM, EAS servers) 120D as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation and/or server stability in signaling optimization in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150. The local proxy 175 can be a protocol agnostic component that can identify a pattern within a byte stream and perform a direct replay of the binary transactions in one embodiment. In another embodiment, the local proxy 175 can maintain or provide application and/or server stability for signaling optimization in a wireless network utilizing proprietary and/or non-proprietary protocols.

In addition, the local proxy 175 can identify and retrieve mobile device properties, including one or more of, battery level, network that the device is registered on, radio state, signal strength, cell identifier (i.e., cell ID), location area code, or whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIG. 2.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices. The proxy server 125 can further aggregate reports on detection of congestion from multiple mobile devices to provide reports on congestion distribution and timing patterns and other information to operators of the networks.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 112, such as that provided by the network service provider, in communicating with the device 150 in achieving network traffic management. Note that SMSC 112 can also utilize any other type of alternative channel including USSD or other network control mechanisms. The host server 100 can forward content or HTTP responses to the SMSC 112 such that it is automatically forwarded to the device 150 if available, and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications. Further, by utilizing the protocol layer optimization techniques described above, signaling in the wireless network can be reduced, along with conservation of battery resources.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously. Furthermore, by preventing the mobile device from constantly attempting to signal the network that is congested, and/or allowing selective (e.g., high priority traffic) towards the network, the local proxy 175 can conserve battery resources of the mobile device.

Figure 1C:
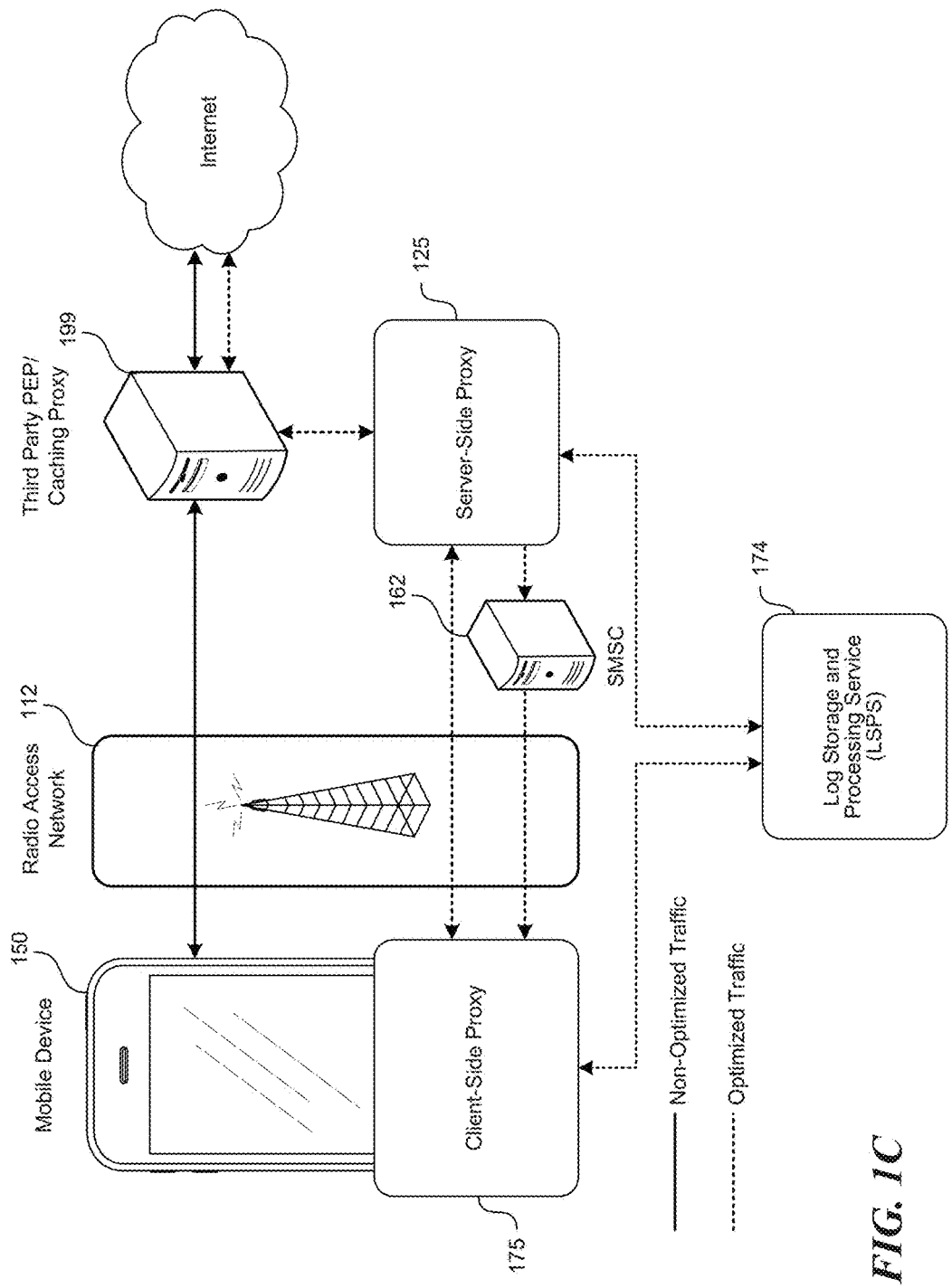
FIG. 1C illustrates an example diagram of the logical architecture of a distributed proxy and cache system.

FIG. 1C illustrates an example diagram of the logical architecture of a distributed proxy and cache system. The distributed system can include, for example the following components:

Client Side Proxy 175: a component installed in a smartphone, mobile device or wireless device 150 that interfaces with device's operating system, as well as with data services and applications installed in the device. The client side proxy 175 is typically compliant with and able to operate with standard or state of the art networking protocols. Additional components and features of the client-side proxy 175 are illustrated with further references to the examples of FIG. 2.

The server side proxy 125 can include one or more servers that can interface with third party application servers (e.g., 199), mobile operator's network (which can be proxy 199 or an additional server that is not illustrated) and/or the client side proxy 175. In general, the server side proxy 125 can be compliant with and is generally able to operate with standard or state of the art networking protocols and/or specifications for interacting with mobile network elements and/or third party servers. Some components and features of the server-side proxy 125 are illustrated with further references to the examples of FIG. 1E.

Log Storage and Processing Service (LSPS) 174: The log storage and processing service, server, system or component 174 can provide reporting and usage analytics services. The LSPS 174 can collect information (e.g., logs) from the client side 175 and/or the server side 125 and provide the necessary tools for producing reports and usage analytics can used for analyzing traffic and signaling data. The client logs (e.g., logs on the client device 150 aggregated by the local proxy 175) are stored in the device until a data channel is activated, and then are transferred in binary format to the LSPS 174. In one embodiment, the logs are processed using log processing tools provided by the LSPS 174. The processed logs are subsequently stored in a distributed database. The logs may be used for reporting as well as for troubleshooting issues. For example, analytics from the logs can be used by the proxy system in managing, reducing or optimizing network traffic or by the network operator in monitoring their networks for possible improvements and enhancements. Note that LSPS 174 as illustrated, may be a server separate from the server-side proxy 125, or it may be a component of the server-side proxy 125, residing partially or wholly therein.

In one implementation, the level of logging (e.g., types of data to be logged, and the like) can be specified using configuration settings in the client-side proxy 175 and/or the server-side proxy 125. Various data relating to bytes and transactions, network connectivity, power, subscriber count, and the like may be logged, and/or processed using default (or another) settings on a periodic (e.g., hourly, daily, and the like) basis.

Bytes and Transactions data may include a number of bytes transacted (both to and from), total number of transactions between the client-side proxy 175 and each application, the client-side proxy 175 and the network (e.g., radio access network 112), the client-side proxy 175 and its cache, and the like. Network Connectivity data may include, for example, total time the device spends in "data connected" state (based on a two-state connectivity model), total number of transitions into the data connected state, the number of times the radio transitions into the data connected state due to a network request that was proxied through the client-side proxy 175, total time spent in the data connected state due to a network request that was proxied through the client-side proxy 175 the number of transitions into data connected mode saved by the client-side and/or server-side proxy system, the amount of time in data connected state saved by the client-side and/or server-side proxy system, simulated values for the previous four items, as if traffic proxied via client-side and/or server-side proxy system were the only traffic on the device. Network connectivity data can also include the amount of time taken to transition from an idle state to connected state (i.e., setup time), a baseline or a reference determined from a sample of setup times, and the like. Power related data may include, for example, each one-percent (or any other percentage value) change in the battery level, the total time the device is powered on but not connected to a power source, and the like. Subscriber count data may include, for example, the number of new subscribers observed in a period and the number of active subscribers in the period. This data may be aggregated by the host server, for example. Reporting of the above data can be done based on variables such as network bearer type (e.g., all, mobile or Wi-Fi), category (e.g., all, device model or application name), time (e.g., hour, day or month), and the like, or combinations thereof.

Figure 1D:
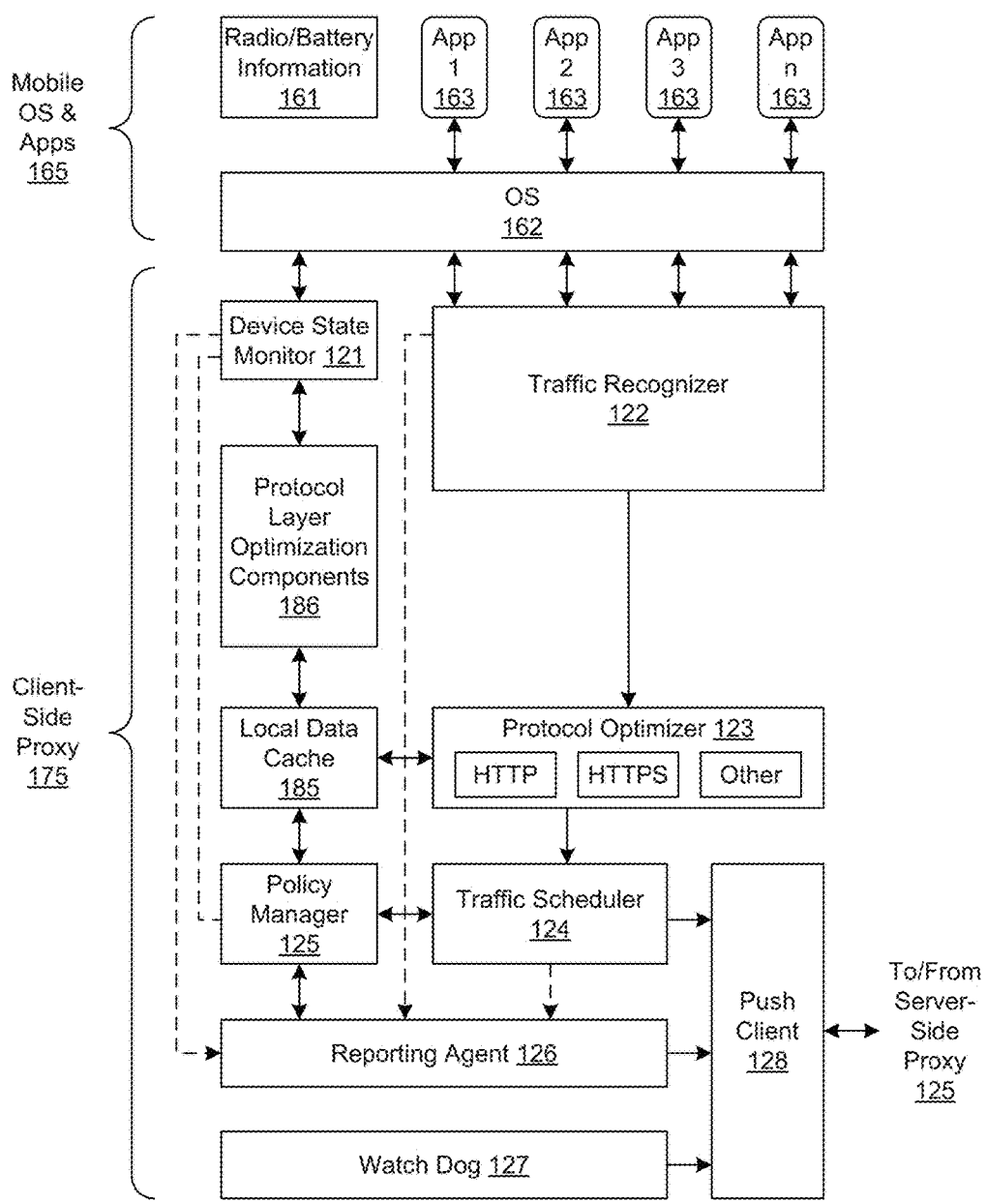
FIG. 1D illustrates an example diagram showing the architecture of client side components in a distributed proxy and cache system having one or more components for optimizing signaling in a wireless network and conserving battery resources based on protocol layer optimization techniques.

FIG. 1D illustrates an example diagram showing the architecture of client-side components in a distributed proxy and cache system, including protocol later optimization components 186.

The client side proxy components 175 can include software components or agents installed on the mobile device that enables traffic optimization and performs the related functionalities on the client side. Components of the client side proxy 175 can operate transparently for end users and applications 163, and interface with the device's operating system (OS) 162. The client side proxy 175 can be installed on mobile devices for optimization to take place, and it can effectuate changes on the data routes and/or timing. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests.

Some example components of the client side proxy 175 are described as follows:

Device State Monitor 121: The device state monitor 121 can be responsible for identifying several states and metrics in the device, such as network status, display status, battery level (e.g., via the radio/battery information 161), etc., such that the remaining components in the client side proxy 175 can operate and make decisions according to device state, acting in an optimal way in each state.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent request from the local cache 185 instead of allowing those request go over the network to the service provider/application host server. One is its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 125: The policy manager 125 can store and enforce traffic optimization and reporting policies provisioned by a Policy Management Server (PMS). At the client side proxy 175 first start, traffic optimization and reporting policies (policy profiles) that is to be enforced in a particular device can be provisioned by the Policy Management Server. Enforcing traffic management policies at the device's IP later lets an operator manage traffic before it uses radio accessed network resources. Policy usage can range from creating highly targeted subscriber plans to proactively and/or reactively managing network congestion. In one implementation, the conditions for selecting a policy for enforcement, and/or conditions for dropping an implemented policy may be managed or coordinated by the policy manager 125.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information (e.g., logs) about the events taking place in the device and sends the information to the log storage and processing service 174, which collects and stores client-side and/or server-side proxy system logs. Event details are stored temporarily in the device and transferred to log storage and processing service 174 only when the data channel state is active. If the client side proxy 175 does not send records within a period of time (e.g., twenty-four hours), the reporting agent 126 may, in one embodiment, attempt to open the connection and send recorded entries or, in case there are no entries in storage, an empty reporting packet. All reporting settings may be configured in the policy management server. The information in the logs may be used for reporting and/or troubleshooting, for example.

Push Client 128: The push client 128 can be responsible for the traffic to between the server side proxy 125 and the client side proxy 175. The push client 128 can send out service requests like content update requests and policy update requests, and receives updates to those requests from the server side proxy 125. In addition, push client 128 can send data to a log storage and processing service 176, which may be internal to or external to the server side proxy 125.

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

Figure 1E:
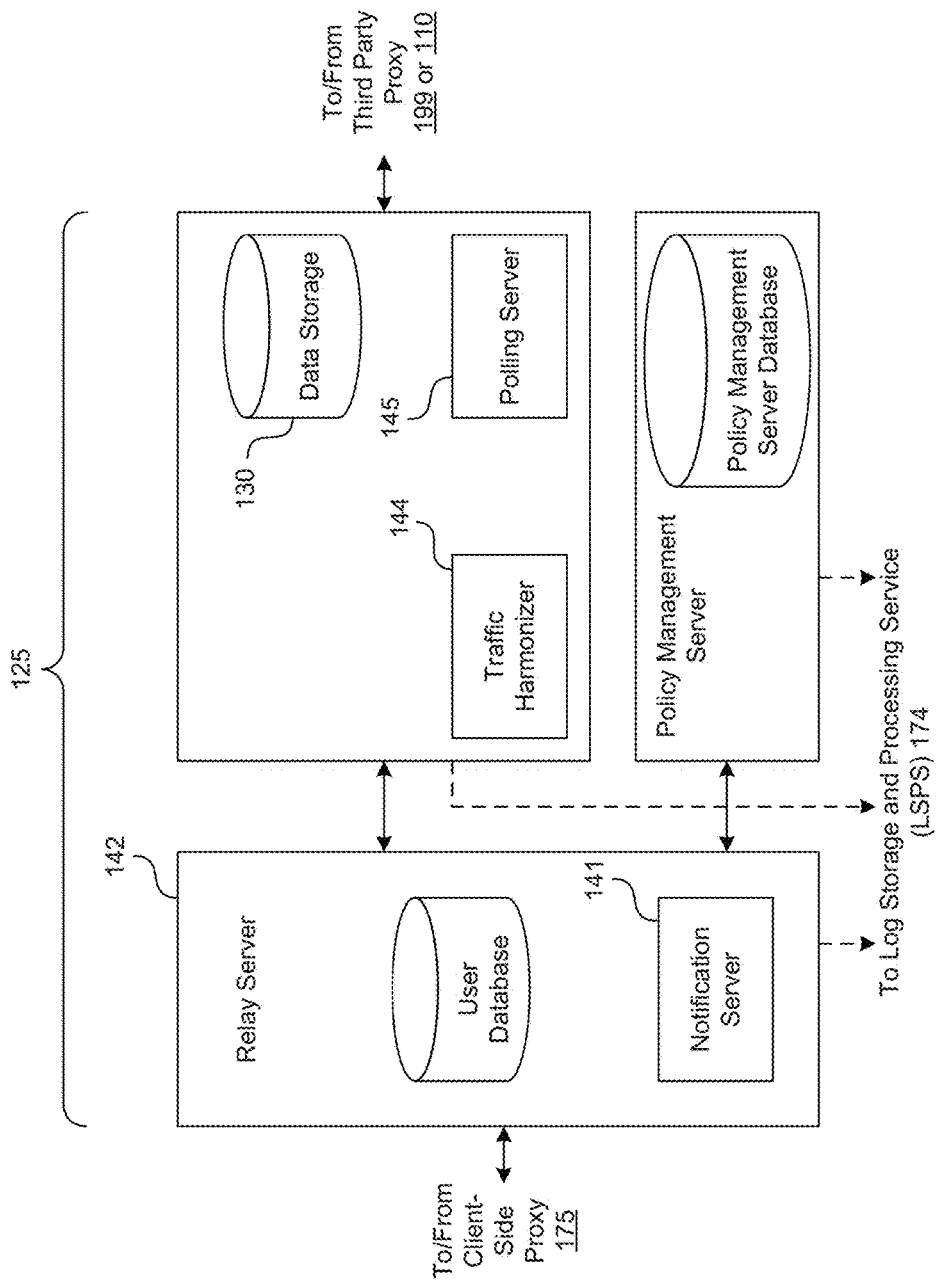
FIG. 1E illustrates a diagram of the example components on the server side of the distributed proxy and cache system.

FIG. 1E illustrates a diagram of the example components on the server side of the distributed proxy and cache system.

The server side 125 of the distributed system can include, for example a relay server 142, which interacts with a traffic harmonizer 144, a polling server 145 and/or a policy management server 143. Each of the various components can communicate with the client side proxy 175, or other third party (e.g., application server/service provider 110 and/or other proxy 199) and/or a reporting and usage analytics system. Some example components of the server side proxy 125 is described as follows:

Relay Server 142: The relay server 142 is the routing agent in the distributed proxy architecture. The relay server 142 manages connections and communications with components on the client-side proxy 175 installed on devices and provides an administrative interface for reports (e.g., congestion reports), provisioning, platform setup, and so on.

Notification Server 141: The notification server 141 is a module able to connect to an operator's SMSC gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource (URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized). If a change occurs (i.e. new data available) for an application, the polling server 145 can report to the traffic harmonizer 144 which in turn sends a notification message to the client-side proxy 175 for it to clear the cache and allow application to poll application server directly.

Policy Management Server 143: The policy management server (PMS) 143 allows administrators to configure and store policies for the client-side proxies 175 (device clients). It also allows administrators to notify the client-side proxies 175 about policy changes. Using the policy management server 143, each operator can configure the policies to work in the most efficient way for the unique characteristics of each particular mobile operator's network.

Log Storage and Processing Service 174: The log storage and processing service 174 collects information (e.g., logs) from the client side 175 and/or from the server side 125, and provides the tools for analyzing and producing reports and usage analytics that operators can use for analyzing application signaling, data consumption, congestion, and the like.

Figure 2:
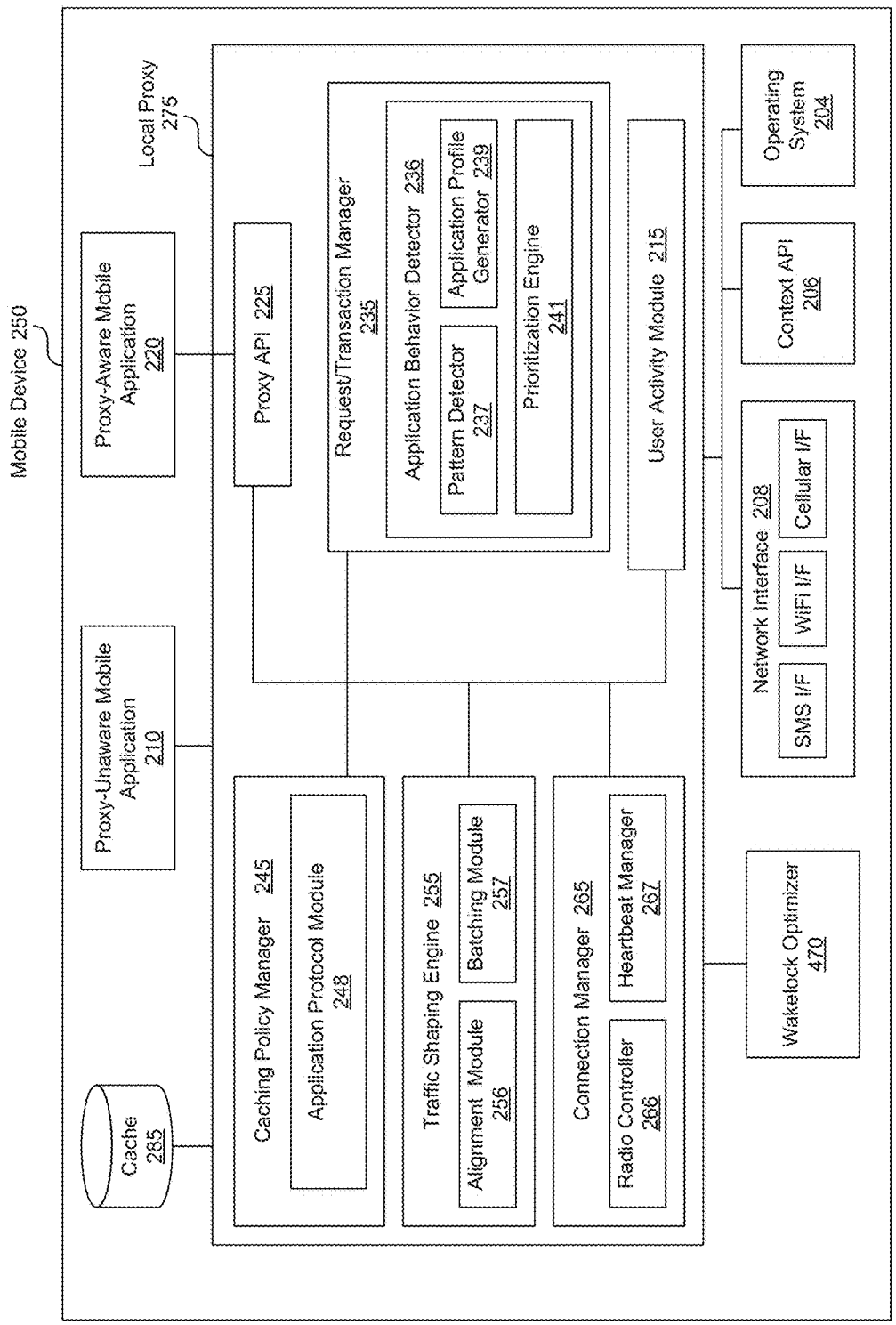
FIG. 2 illustrates a block diagram depicting an example of client-side components in a distributed proxy and cache system, further including one or more components for optimizing signaling in a wireless network and conserving battery resources based on protocol layer optimization techniques.

FIG. 2 illustrates a block diagram depicting an example of client-side components in a distributed proxy and cache system, further including protocol later optimizer components.

A device 250, which can be a portable or mobile device (e.g., any wireless device), such as a portable phone, generally includes, for example, a network interface 208, an operating system 204, a context API 206, and mobile applications which may be proxy-unaware 210 or proxy-aware 220. Note that the device 250 is specifically illustrated in the example of FIG. 2 as a mobile device, such is not a limitation and that device 250 may be any wireless, broadband, portable/mobile or non-portable device able to receive, transmit signals to satisfy data requests over a network including wired or wireless networks (e.g., WiFi, cellular, Bluetooth, LAN, WAN, and the like).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, WiFi interface, interfaces for various generations of mobile communication standards including but not limited to 2G, 3G, 3.5G, 4G, LTE, and the like), Bluetooth, or whether or not the connection is via a router, an access point, a wireless router, a switch, a multilayer switch, a protocol converter, a gateway, a bridge, a bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245 having an application protocol module 248, a traffic shaping engine 255, and/or a connection manager 265. The traffic shaping engine 255 may further include an alignment module 256 and/or a batching module 257, the connection manager 265 may further include a radio controller 266 and a heartbeat manager 267. The request/transaction manager 235 can further include an application behavior detector 236 and/or a prioritization engine 241, the application behavior detector 236 may further include a pattern detector 237 and/or and application profile generator 239. Device 250 can also include a wakelock optimizer 470 which can implement the disclosed methods and techniques. Additional or less components/modules/engines can be included in the local proxy 275 and each illustrated component.

In one embodiment, a portion of the distributed proxy and cache system for network traffic management resides in or is in communication with device 250, including local proxy 275 (mobile client) and/or cache 285. The local proxy 275 can provide an interface on the device 250 for users to access device applications and services including email, IM, voice mail, visual voicemail, feeds, Internet, games, productivity tools, or other applications, etc.

The proxy 275 is generally application independent and can be used by applications (e.g., both proxy-aware and proxy-unaware applications 210 and 220 and other mobile applications) to open TCP connections to a remote server (e.g., the server 100 in the examples of FIG. 1A-1B and/or server proxy 125 shown in the examples of FIG. 1B. In some instances, the local proxy 275 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, and the like. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground, or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power, and/or further optimize signaling in the network. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100 in the examples of FIG. 1A-1B) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server 100 in the examples of FIG. 1A-1B) send the data that was buffered as a result of the previously decreased communication frequency.

In addition, or in alternative, the local proxy 275 can communicate the characteristics of user activity at the device 250 to the remote device (e.g., host server 100 in the examples of FIG. 1A-1B) and the remote device determines how to alter its own communication frequency with the device 250 for network resource conservation and conservation of device 250 resources.

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with an application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or in additionally be set by the particular application; for example, the Facebook application (e.g., a mobile application) can set its own priorities for various transactions (e.g., a status update can be of higher priority than an add friend request or a poke request, a message send request can be of higher priority than a message delete request, for example), an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | New email in deleted items | Low |
| Read more | High | | |
| Download attachment | High | Delete an email | Low |
| | | (Un)Read an email | Low |
| New Calendar event | High | Move messages | Low |
| Edit/change Calendar event | High | Any calendar change | High |
| | | Any contact change | High |
| Add a contact | High | Wipe/lock device | High |
| Edit a contact | High | Settings change | High |
| Search contacts | High | Any folder change | High |
| Change a setting | High | Connector restart | High (if no changes nothing is sent) |
| Manual send/receive | High | | |
| IM status change | Medium | Social Network Status Updates | Medium |
| Auction outbid or change notification | High | Severe Weather Alerts | High |
| Weather Updates | Low | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 275 or another device/entity) can be used cause a remote device to modify its communication with the frequency with the mobile device or wireless device. For example, the remote device can be configured to send notifications to the device 250 when data of higher importance is available to be sent to the mobile device or wireless device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100, as shown in FIG. 1A or a content provider/application server such as the server/provider 110 shown in the examples of FIG. 1A and FIG. 1B). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 275 can query a remote proxy (e.g., the server proxy) to determine whether a remotely stored response is valid. If so, the remotely stored response (e.g., which may be stored on the server cache 135 or optional caching server 199 shown in the example of FIG. 1B) can be provided to the mobile device, possibly without the mobile device 250 needing to access the cellular network, thus relieving consumption of network resources.

If a valid cache response is not available, or if cache responses are unavailable for the intercepted data request, the local proxy 275, for example, the caching policy manager 245, can send the data request to a remote proxy (e.g., server proxy 125 of FIG. 1B) which forwards the data request to a content source (e.g., application server/content provider 110 of FIG. 1A) and a response from the content source can be provided through the remote proxy. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 246 of the caching policy manager 245) on the local proxy 275 allows for optimization of any protocol that can be port mapped to a handler in the distributed proxy (e.g., port mapped on the proxy server 125 in the example of FIG. 1B).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed data is not available, thus freeing up network resources and preventing network congestion.

In one embodiment, the local proxy 275 includes an application behavior detector 236 to track, detect, observe, monitor, applications (e.g., proxy-aware and/or unaware applications 210 and 220) accessed or installed on the device 250. Application behaviors, or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1A) that would result from the application requests that would be performed at the mobile device or wireless device 250 to be performed instead, by a proxy server (e.g., proxy server 125 of FIG. 1B) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed and/or new data has been received, the remote entity (e.g., the host server) to which polling is offloaded, can notify the device 250.

In one embodiment, the local proxy 275 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1C) to generate and send the heartbeat messages to maintain a connection with the backend (e.g., application server/provider 110 in the example of FIG. 1A).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

In one embodiment, the wakelock optimization techniques:

(1) identify native wakelock to have been acquired for X seconds (X=configurable timer), the system executes dumpsys-power and extracts which wakelocks are being held;

(2) If the wakelock being held matches the list of target wakelocks, the native wakelock is killed (3) Every Y seconds (with timer, not alarm) the system executes dumpsys-power to check if any other wakelocks have been acquired, and if they have, or if screen goes ON, the system can add the native wakelock back.

Regarding (1)-(3), above, the (3) should continue as long as the original targeted wakelock is still active (and no other wakelocks are—if they are, native waklock is added back). Once it disappears, the system returns to step (1). And if native wakelock is added back, the system should return to step (1), to again check after X seconds.

In one embodiment, the system implements some APIs to execute "chmod" and/or "dumpsys" in OCC. The following subtasks include:

1. Implement some applications to execute CHMOD and DUMPSYS. CHMOD allows altering of access permissions. DUMPSYS dumps information in the Online Chat Center.
2. Implement native wakelock observer. This may be carried out by the native wakelock observer module shown in FIG. 3B.
3. Detect application-specific wakelock changes. In this manner, a wakelock for a specific application causing undesirable power consumption may be isolated.
4. Integrate wakelock aggressively to release wakelocks with legacy logic.

5. Record the native wakelock changes to the CRCS logs.
6. Replace OCS when detecting long duration native wakelock and application-specific wakelock.
7. Implement a workaround solution to support DUMPSYS power in a restricted device.
8. Move application wakelock configuration to an application.
9. Get DUMPSYS power when device is root restricted.

In one embodiment, the implementation of Wakelock on Android is managed by PowerManagerService. In some instances, on Android:

a. The wakelocks acquired by application (app) are stored in one list of PowermanagerService.
b. When the first app acquires wakelock, PowerManagerSarvice applies one native wakelock by power.c of Linux layer. Linux will store the native wakelock's name to "/sys/power/Wake_lock". The native wakelock's name is "PowerManagerService" in Android 4.2.2 and changes as "PowerManagerService.Wakelocks" in follow up version.
c. All apps' wakelocks can share the same global "native" wakelock in Linux layer.

After all Java wakelocks are released, PowerManagerSerivce will release this native wakelock. Linux side will write the same name to "/sys/powerlwake_unlock" to release the native wakelock.

In one embodiment, the native wakelock can be released by writing the native wakelock name to "/sys/power/Wake_unlock". In one embodiment, the system can modify the wakelock list in PowerManagerSerivce directly. In one embodiment, apps can be optimized wakelock by killing app or disabling app. However, this will affect application behavior and user experience.

FIGS. 3A-3D illustrate examples of the wakelock optimization techniques.

Figure 3A:
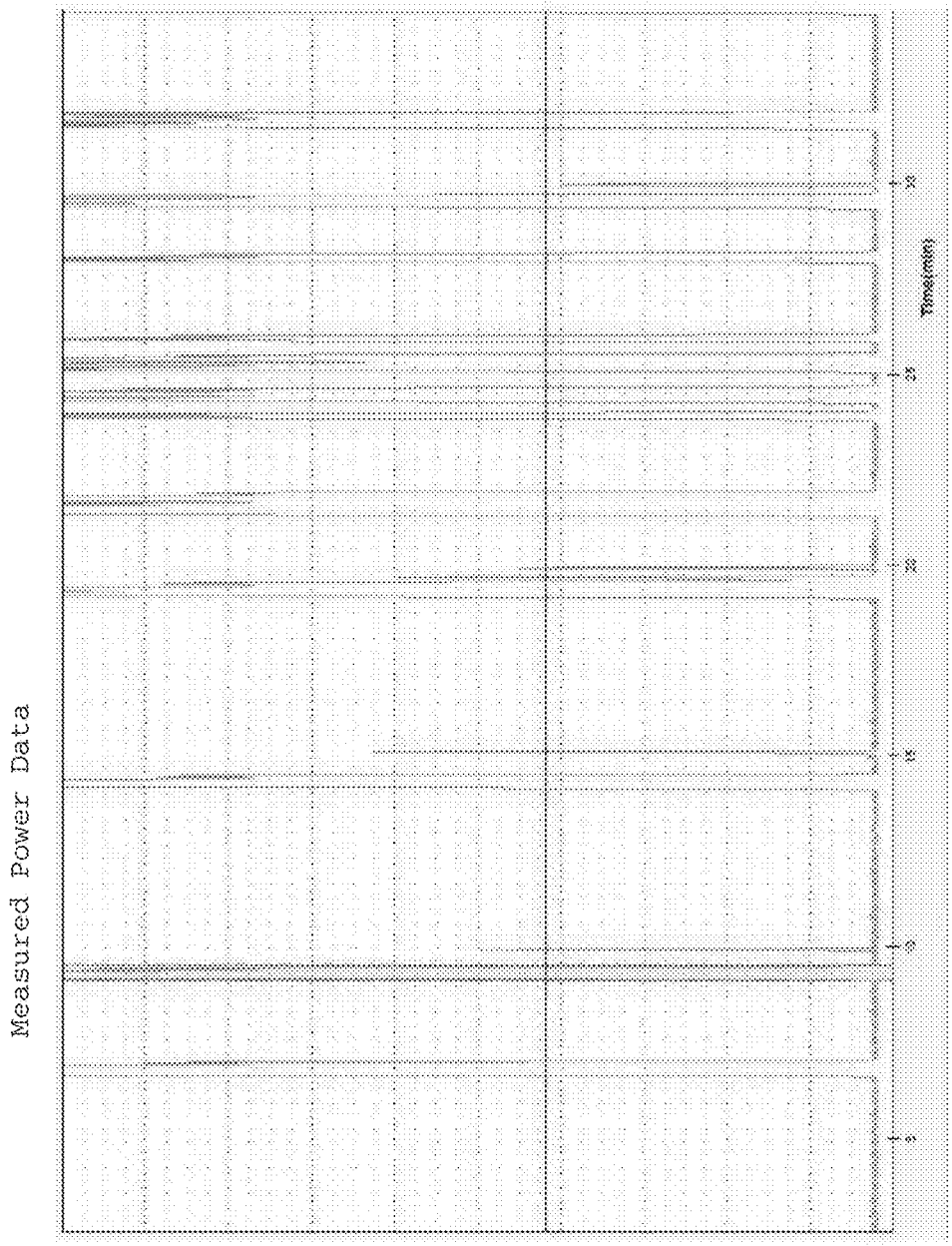
FIG. 3A illustrates an example output of a power monitor utilizing the wakelock optimizer (wakelock release functionality).

FIG. 3A illustrates an example output of a power monitor utilizing the wakelock optimizer (wakelock release functionality). As illustrated, when a wakelock is released, the measured power data reduces significantly for the mobile device 250.

Figure 3B:
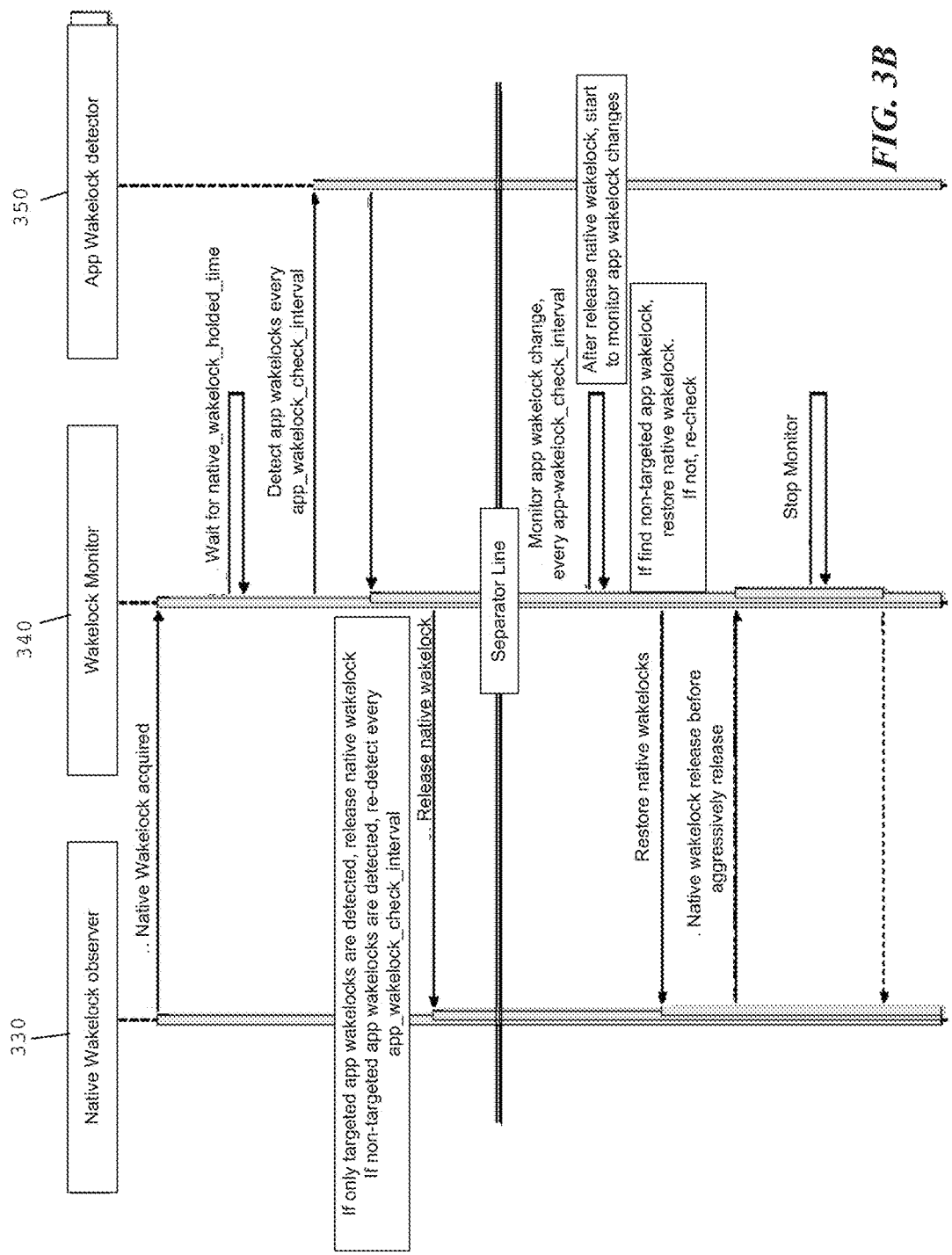
FIG. 3B illustrates example signaling diagrams showing signaling utilized during wakelock techniques described herein.

FIG. 3B illustrates an example sequence diagram utilizing the wakelock optimizer (wakelock release functionality). For example, in one embodiment, the following steps occur:

1. The native wakelock observer 330 monitors the native wakelock change and the wakelock monitor 340 monitors the detected wakelocks.
2. The wakelock detector 350 detect wakelocks for applications after any native wakelocks are held for a predetermined period of time.
3. The wakelock detector 350 detect application wakelocks at every predetermined interval. This interval may be adjusted as disclosed herein. If only targeted application wakelocks are detected, release the native wakelock. If non-targeted application wakelocks are detected, re-detect every application wakelock at a predetermined interval.
4. The wakelock monitor 340 monitor application wakelock change for every application wakelock after releasing the native wakelock. If a non-targeted application wakelock is detected, restore the native wakelock. If a non-targeted application wakelock is not detected, re-check for an application wakelock.

Figure 3C:
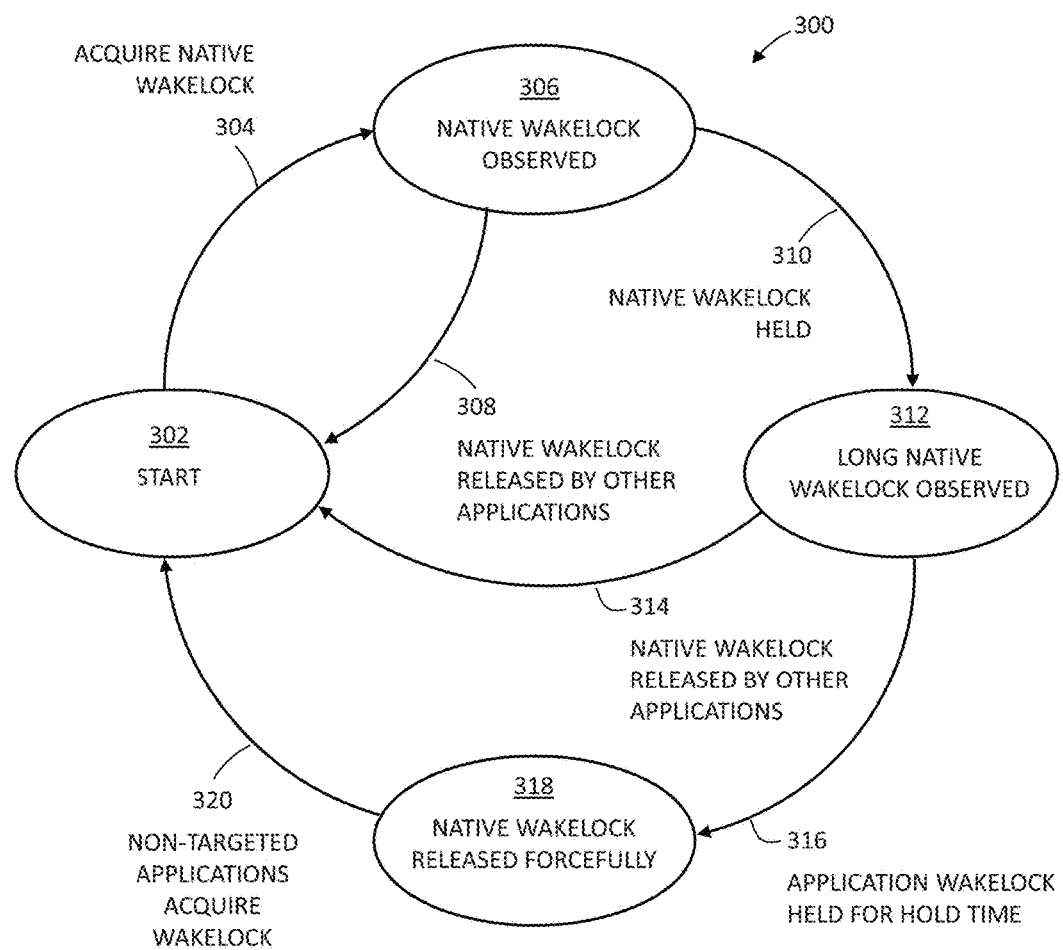
FIG. 3C illustrates an example state diagram utilizing the wakelock optimizer (wakelock release functionality).

FIG. 3C illustrates an example state diagram 300 utilizing the wakelock optimizer (wakelock release functionality). In one embodiment, one or more of the following configurations 300 may occur:

Start the process 302. Acquire a native wakelock 304. The native wakelock is then observed 306. The native wakelock may be released by other applications 308. Alternatively, the native wakelock is held for a predetermined period of time 310. This avoids overly frequent checking and detection of wakelocks, thus conserving battery resources on the mobile device. In one or more embodiments, wakelock hold time may be set to 20 seconds. In this manner, a wakelock that is released but would have otherwise kept an active application alive will not go to "sleep" just after acquiring wakelock.

A long native wakelock may be observed 312. Native wakelocks may be released by other applications 314. Or the application wakelock may be held for the hold time 316. The native wakelock may then be released forcefully 318. Wakelocks may then be checked for again at a predetermined interval. In one embodiment, this interval may be 50 seconds. Some non-targeted applications may acquire a wakelock 320.

Policy Management for Signaling Optimization (PMS) configurations may be provided. The PMS configurations may be embodied as a wakelock function where the minimal time a native wakelock is held. This time period may be 10 seconds. A further function may be embodied where a wakelock is held for a minimal time immediately after an acquired wakelock in order to avoid device going into sleep at a time when the device is likely in use. This time period may be 20 seconds. An interval to recheck already detected wakelocks may be set. This time period may be set at 50 seconds.

Figure 4:
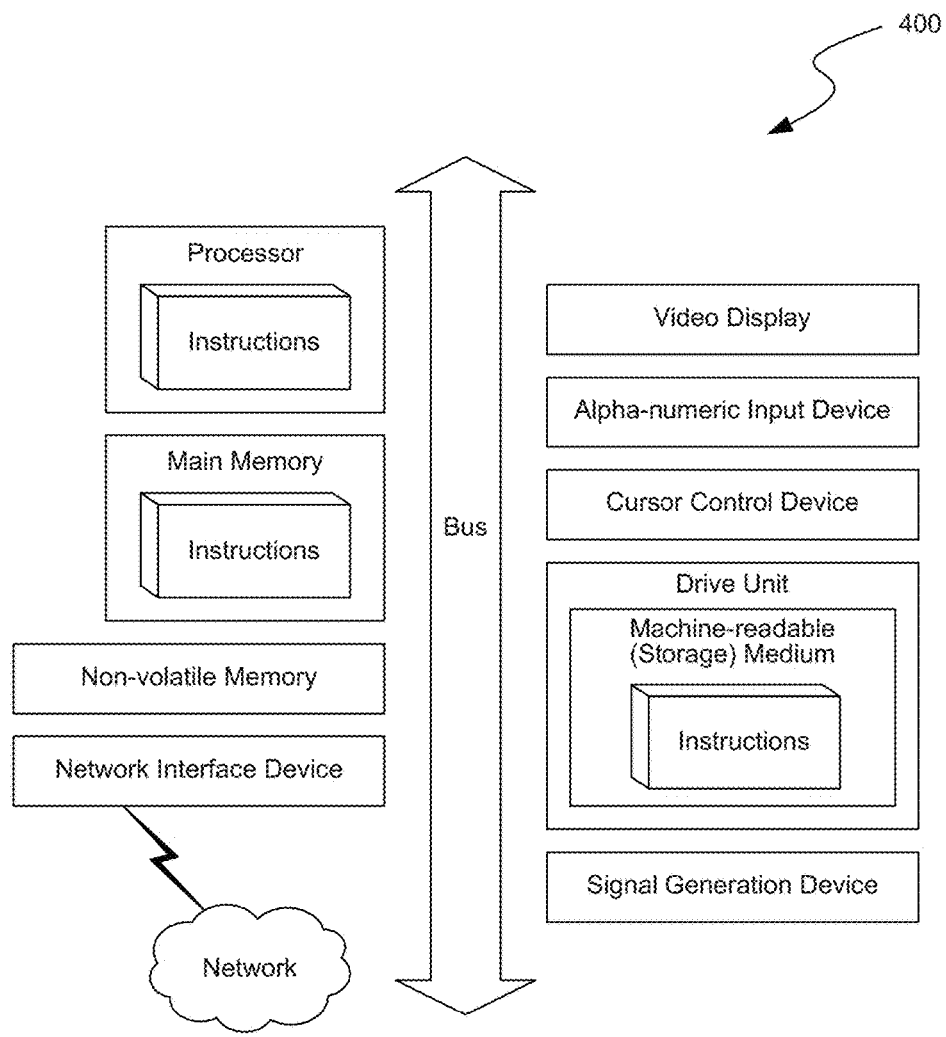
FIG. 4 shows a diagrammatic representation of a machine in the example form of a computer system within which a set of instructions, for causing the machine to perform any one or more of the methodologies discussed herein, may be executed.

FIG. 4 shows a diagrammatic representation of a machine in the example form of a computer system within which a set of instructions, for causing the machine to perform any one or more of the methodologies discussed herein, may be executed.

In the example of FIG. 4, the computer system 400 includes a processor, memory, non-volatile memory, and an interface device. Various common components (e.g., cache memory) are omitted for illustrative simplicity. The computer system 400 is intended to illustrate a hardware device on which any of the components depicted in the example of FIG. 2 (and any other components described in this specification) can be implemented. The computer system 400 can be of any applicable known or convenient type. The components of the computer system 400 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system 400 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Figure 5:
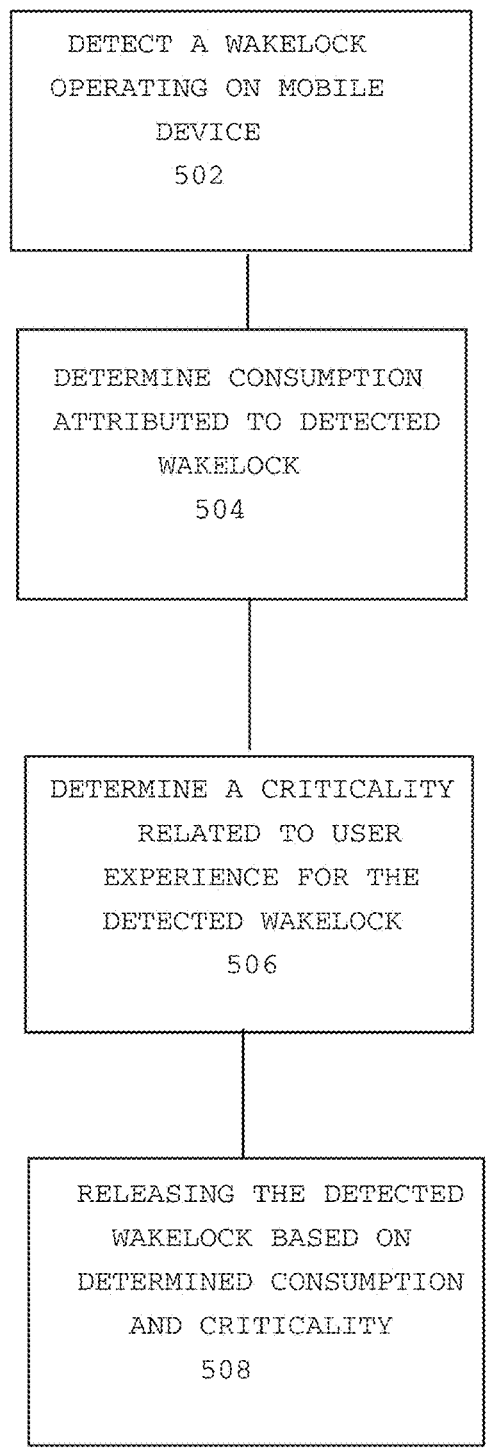
FIG. 5 shows a flowchart of a method for being carried out on a computing device.

A flowchart depicting one or more methods is illustrated in FIG. 5. In accordance with one or more embodiments, a method is provided that includes detecting a wakelock operating on a mobile device 502; determining a consumption of one of a power or radio usage attributed to the detected wakelock 504; determining a criticality related to user experience for the detected wakelock 506; and releasing the detected wakelock based on the determined consumption and criticality 508.

In accordance with one or more embodiments, releasing the detected wakelock based on the determined consumption and criticality includes releasing the detected wakelock if the determined criticality and determined consumption are not within predetermined ranges.

In accordance with one or more embodiments, the method includes determining if a detected wakelock is native or non-native to the mobile device.

In accordance with one or more embodiments, detecting a wakelock includes detecting a wakelock at predetermined intervals.

In accordance with one or more embodiments, determining a criticality related to user experience includes determining that a wakelock is unnecessary for operation of the mobile device.

In accordance with one or more embodiments, determining a criticality related to user experience includes determining a criticality on an application-by-application basis.

In accordance with one or more embodiments, when only wakelocks below a predetermined criticality are detected, a method includes releasing any wakelocks that are native to the mobile device.

In accordance with one or more embodiments, when wakelocks above a predetermined criticality are detected, a method includes continue detecting wakelocks operating on the mobile device.

In accordance with one or more embodiments, a method includes detecting wakelocks operating on the mobile device at a subsequent time, and monitoring changes between the detected wakelocks and subsequently detected wakelocks.

In accordance with one or more embodiments, a method includes restoring released native wakelocks if the subsequently detected wakelocks are above the predetermined criticality.

In accordance with one or more embodiments, a method includes monitoring changes comprises identifying patterns of previously detected wakelocks. The patterns are stored within a cache of the mobile device.

In one or more embodiments, a mobile device is provided. The mobile device includes computer control code that when executed by a processor on the mobile device causes the mobile device to detect a wakelock operating on a mobile device, determine or receive a criticality assessment related to user experience for the detected wakelock, and release a detected or received wakelock based on the determined criticality. In this manner, each application could characterize their generated wakelocks as critical or not critical and provide that information to the mobile device for use in determining whether and when to release a wakelock or allow a wakelock. As such, a method may be provided that includes receiving a criticality assessment of a given wakelock and then determining an optimization strategy in view of the wakelock and criticality assessment.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" or "computer control code" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The invention claimed is:

1. A mobile device comprising:
a display screen;
a memory, and a processor, the mobile device configured to:
acquire a system wakelock in response to an application wakelock acquisition request;
detect an activity state of the mobile device based on a status of the display screen;
enter a power optimization state based on the detected activity state;
release the system wakelock upon entering the power optimization state when the application that made the acquisition request is not critical to user experience, wherein the criticality is characterized on an application-by-application basis;
acquire, while in the power optimization state, the system wakelock in response to a subsequent wakelock acquisition request from another application on the mobile device, wherein to acquire the system wakelock is based on the characterized criticality.

2. The mobile device of claim 1, wherein the activity state is based on whether keystrokes are detected on the mobile device.

3. The mobile device of claim 1, wherein the activity state is based on whether motion is sensed by the mobile device.

4. The mobile device of claim 3, wherein the mobile device exits the power optimization state when any of the following occur:
keystrokes are detected on the mobile device;
motion is sensed by the mobile device;
a change in the status of the display screen.

5. The mobile device of claim 4, wherein the mobile device is configured to acquire the system wakelock in response to an application wakelock acquisition request when the mobile device has exited the power optimization state without reference to a criticality of the application making the application wakelock acquisition request.

6. The mobile device of claim 1, wherein the power optimization state is further in response to whether the mobile device is connected to a power source.

7. The mobile device of claim 1, wherein the activity state is based on each of whether keystrokes are detected on the mobile device, motion is sensed by the mobile device, and a change in the status of the display screen of the mobile device.

8. The mobile device of claim 1, wherein the mobile device is configured to release the system wakelock in response to an application wakelock release request.

9. The mobile device of claim 1, wherein the status of the display screen includes whether the screen is on.

10. The mobile device of claim 1, wherein acquisition of the system wakelock in response to a wakelock acquisition request is based on the criticality such that not all wakelock requests result in acquiring the system wakelock.

11. The mobile device of claim 1, wherein, while in the power optimization state, the system wakelock remains released unless a subsequent wakelock acquisition request is by the another application, wherein a subsequent wakelock acquisition request, while in the power optimization state, by the application does not cause acquisition of the system wakelock.

12. The mobile device of claim 1, wherein the mobile device is configured to terminate an application based on a monitored behavior of the application.

13. The mobile device of claim 1, wherein the mobile device is further configured to enter the power optimization state based on user inactivity.

14. The mobile device of claim 1, wherein to acquire the system wakelock in response to an application wakelock request occurs after detecting a wakelock acquisition request.

15. The mobile device of claim 1, wherein the mobile device is further configured to allow execution of the application while adjusting whether to acquire the system wakelock based on the characterized criticality.

16. The mobile device of claim 1, wherein, while in the power optimization state, a subsequent wakelock acquisition request by the application does not cause acquisition of the system wakelock.

17. The mobile device of claim 1, wherein the power optimization state improves device resource management while in the power optimization state, wherein improving device resource management includes improving battery life.

18. A method comprising:
    acquiring a system wakelock in response to an application wakelock acquisition request on a mobile device;
    detecting an activity state of the mobile device based on a status of a display screen of the mobile device;
    entering a power optimization state based on the detected activity state;
    releasing the system wakelock upon entering the power optimization state when the application that made the acquisition request is not critical to user experience, wherein the criticality is characterized on an application-by-application basis;
    acquiring, while in the power optimization state, the system wakelock in response to a subsequent wakelock acquisition request from another application on the mobile device, wherein acquiring the system wakelock is based on the characterized criticality.

19. The method of claim 18, wherein the activity state is based on whether keystrokes are detected on the mobile device.

20. The method of claim 18, wherein the activity state is based on whether motion is sensed by the mobile device.

21. The method of claim 18, wherein entering the power optimization state is further in response to whether the mobile device is connected to a power source.

22. The method of claim 18, wherein the activity state is based on each of whether keystrokes are detected on the mobile device, motion is sensed by the mobile device, and a change in the status of the display screen of the mobile device.

23. The method of claim 18, exiting the power optimization state when any of the following occur:
    keystrokes are detected on the mobile device;
    motion is sensed by the mobile device;
    a change in the status of the display screen.

24. The method of claim 23, wherein acquiring the system wakelock is in response to an application wakelock acquisition request when the mobile device has exited the power optimization state without reference to a criticality of the application making the application wakelock acquisition request.

25. The method of claim 18, comprising releasing the system wakelock in response to an application wakelock release request.

26. The method of claim 18, wherein the status of the display screen includes whether the screen is on.

27. The method of claim 18, wherein acquisition of the system wakelock in response to a wakelock acquisition request is based on the criticality such that not all wakelock requests result in acquiring the system wakelock.

28. The method of claim 18, wherein, while in the power optimization state, the system wakelock remains released unless a subsequent wakelock acquisition request is by the another application, wherein a subsequent wakelock acquisition request, while in the power optimization state, by the application does not cause acquisition of the system wakelock.

29. The method of claim 18, comprising terminating an application based on a monitored behavior of the application.

30. The method of claim 18, wherein entering the power optimization state is further based on user inactivity.

31. The method of claim 18, wherein acquiring the system wakelock in response to an application wakelock request occurs after detecting a wakelock acquisition request.

32. The method of claim 18, comprising allowing execution of the application while adjusting whether to acquire the system wakelock based on the characterized criticality.

33. The method of claim 18, wherein, while in the power optimization state, a subsequent wakelock acquisition request by the application does not cause acquisition of the system wakelock.

34. The method of claim 18, wherein the power optimization state improves device resource management while in the power optimization state, wherein improving device resource management includes improving battery life.

35. A mobile device comprising:
    a display screen;
    a memory, and a processor, the mobile device configured to:
        determine a criticality of applications executing on the mobile device, wherein the criticality is determined on an application-by-application basis;
        acquire a system wakelock in response to an application wakelock acquisition request for the application;
        detect an activity state of the mobile device based on a status of the display screen, wherein the status of the display screen includes whether the screen is on;
        enter a power optimization state based on the detected activity state;
        while in the power optimization state:
            release the system wakelock upon entering the power optimization state when the application that made the acquisition request is not critical, wherein a subsequent wakelock acquisition request by the application does not cause acquisition of the system wakelock and the system wakelock remains released unless a subsequent wakelock acquisition request is by a critical application;

acquire the system wakelock in response to a subsequent wakelock acquisition request from a critical application on the mobile device.

36. The mobile device of claim 35, wherein the mobile device is configured to terminate an application based on a monitored behavior of the application.

37. The mobile device of claim 35, wherein the mobile device is further configured to enter the power optimization state based on user inactivity.

38. The mobile device of claim 35, wherein to acquire the system wakelock in response to an application wakelock request occurs after detecting a wakelock acquisition request.

39. The mobile device of claim 35, wherein the mobile device is further configured to allow execution of the application.

40. The mobile device of claim 35, wherein the mobile device exits the power optimization state when any of the following occur:
   keystrokes are detected on the mobile device;
   motion is sensed by the mobile device;
   a change in the status of the display screen.

41. The mobile device of claim 40, wherein the system wakelock is acquired in response to a wakelock acquisition request after the mobile device has exited the power optimization state.

42. The mobile device of claim 35, wherein the power optimization state improves device resource management while in the power optimization state, wherein improving device resource management includes improving battery life.

\* \* \* \* \*